(12) United States Patent
Imanishi

(10) Patent No.: US 7,676,847 B2
(45) Date of Patent: Mar. 9, 2010

(54) APPLICATION EXECUTION DEVICE, APPLICATION EXECUTION METHOD, INTEGRATED CIRCUIT, AND COMPUTER-READABLE PROGRAM

(75) Inventor: Yoshinori Imanishi, Hiroshima (JP)

(73) Assignee: Panasonic Corporation, Osaka (JP)

( * ) Notice: Subject to any disclaimer, the term of this patent is extended or adjusted under 35 U.S.C. 154(b) by 1035 days.

(21) Appl. No.: 10/571,141

(22) PCT Filed: Sep. 17, 2004

(86) PCT No.: PCT/JP2004/014029

§ 371 (c)(1),
(2), (4) Date: Mar. 9, 2006

(87) PCT Pub. No.: WO2005/029842

PCT Pub. Date: Mar. 31, 2005

(65) Prior Publication Data

US 2007/0033651 A1 Feb. 8, 2007

(30) Foreign Application Priority Data

Sep. 17, 2003 (JP) ............................. 2003-324158

(51) Int. Cl.
*G06F 7/04* (2006.01)
(52) U.S. Cl. .................... 726/30; 726/4; 726/5; 726/6; 726/18; 713/152; 713/185; 710/200
(58) Field of Classification Search .................. 726/4, 726/5, 6, 18, 30; 713/152, 185; 710/200
See application file for complete search history.

(56) References Cited

U.S. PATENT DOCUMENTS 5,915,085 A 6/1999 Koved 6,526,513 B1 2/2003 Shrader et al.
6,694,434 B1 * 2/2004 McGee et al. ............... 713/189
2002/0019941 A1 2/2002 Chan et al.

FOREIGN PATENT DOCUMENTS

EP 0 752 786 B1 2/2000
JP 9-121340 5/1997

OTHER PUBLICATIONS

"Digital Video Broadcasting (DVB); Multimedia Home Platform (MHP) Specification 1.0.3; Draft ES 201 812" ETSI Standards, European Telecommunications Standards Institute, Sophia-Antipo, FR, vol. BC, No. V111, Jul. 2003, XP014004401, pp. 41-51, 141-144, 151-195.
Gong L DK12SPEC PDF/Java-TM-Securityarchitecture PDF: "Java Security Architecture (JDK 1.2). Version 1.0" Java Security, Dec. 6, 1998, XP002171445 p. 1, line 1-p. 7, last line.

* cited by examiner

*Primary Examiner*—Emmanuel L Moise
*Assistant Examiner*—Paul Callahan
(74) *Attorney, Agent, or Firm*—Wenderoth, Lind & Ponack, L.L.P.

(57) ABSTRACT

An application is activated with access permission to resources which are granted to unsigned applications. In parallel with the execution of the application, tamper check is performed on the application using a tamper check thread. When access to a resource which is not granted to unsigned applications is requested during the execution of the application before the completion of the tamper check, the application is put in a wait state until the completion of the tamper check. After the application is judged as having been untampered with as a result of the tamper check, the application is further granted access permission to resources that are specified by a permission information file included in the application. If this further-granted access permission includes the access right to the resource, the execution of the application is continued.

16 Claims, 20 Drawing Sheets

FIG.9

| | Permissions | Unsigned application | Signed application |
|---|---|---|---|
| Basic Permission | java.awt.AWTPermission | NECESSARY FOR MHP (GRAPHICS RENDERING) | |
| | java.util.PropertyPermission | PropertyPermission("file.separator","read"); PropertyPermission("path.separator","read"); PropertyPermission("line.separator","read"); PropertyPermission("mhp.eb.version.major","read"); PropertyPermission("mhp.eb.version.minor","read"); | PropertyPermission("mhp.option.*","read"); |
| | | | PropertyPermission("dvb.persistent.root"); |
| | java.io.FilePermission | ✗ | PERMISSION TO READ DSM-CC MOUNT POINT AND BELOW |
| | javax.tv.media.MediaSelectPermission | | MediaSelectPermission("*",null); |
| | javax.tv.service.ReadPermission | | ReadPermission("*",null); |
| | javax.tv.service.selection.ServiceContextPermission | | ServiceContextPermission("access","own"); |
| Additional Permission | java.util.PropertyPermission | ✗ | SPECIFIED ACCORDING TO PERMISSION INFORMATION FILE |
| | java.io.FilePermission | ✗ | |
| | org.dvb.net.ca.CAPermission | ✗ | |
| | org.dvb.application.AppsControlPermission | ✗ | |
| | org.dvb.net.rc.RCPermission | ✗ | |
| | org.dvb.net.tuning.TunerPermission | ✗ | |
| | javax.tv.service.selection.SelectPermission | ✗ | |
| | org.dvb.user.UserPreferencePermission | ✗ | |
| | java.net.SocketPermission | ✗ | |
| | org.dvb.media.DripFeedPermission | ✗ | |

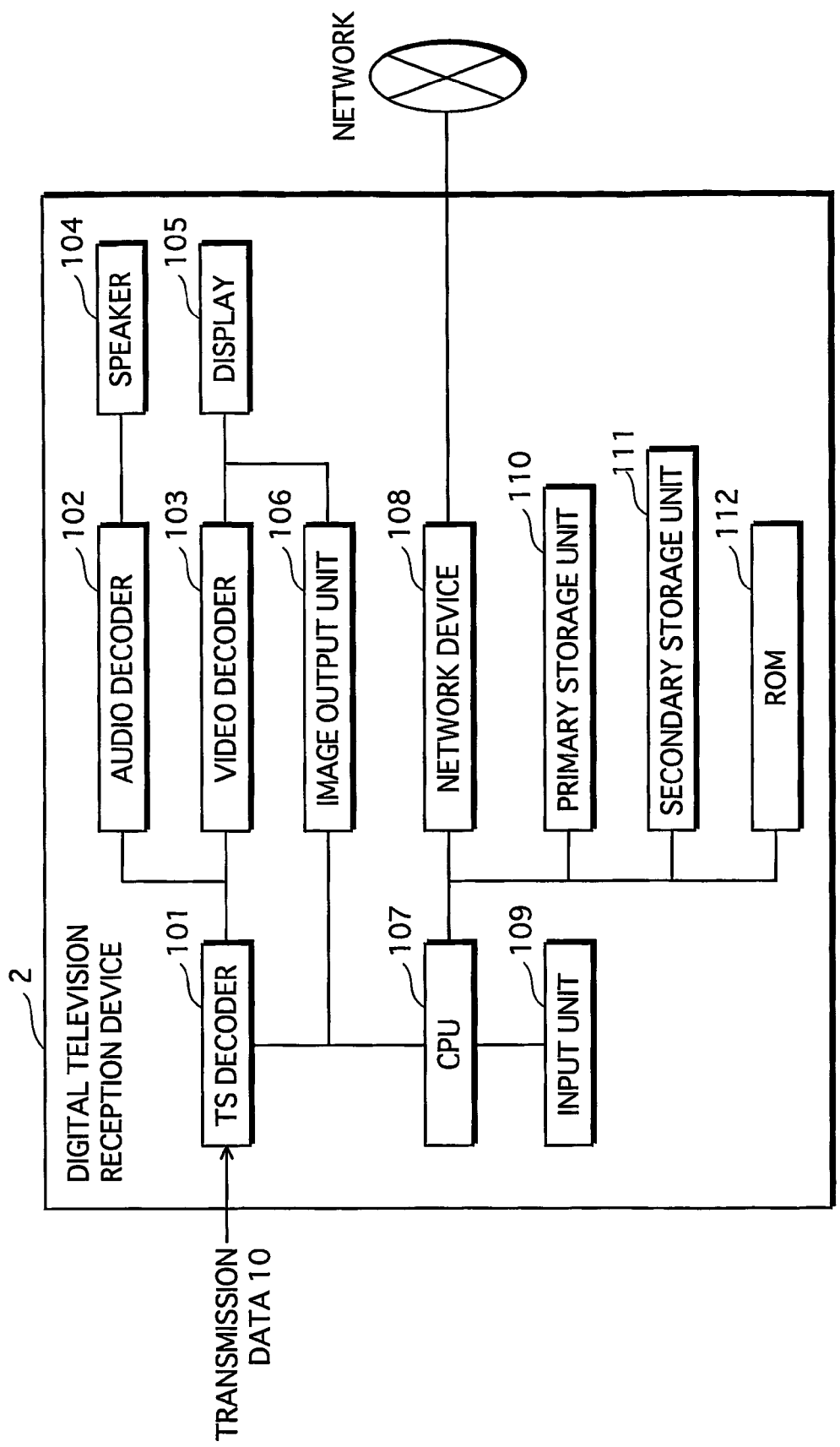

APPLICATION EXECUTION DEVICE, APPLICATION EXECUTION METHOD, INTEGRATED CIRCUIT, AND COMPUTER-READABLE PROGRAM

TECHNICAL FIELD

The present invention relates to an application execution device which acquires and executes application programs, and in particular relates to techniques of executing application programs acquired via digital television broadcasting.

BACKGROUND ART

In recent years, studies have been conducted on a variety of digital television broadcasting standards. One example of such standards is MHP (Multimedia Home Platform) which is employed in many countries. According to MHP, a broadcast device multiplexes an application program (hereafter simply referred to as an "application") in a broadcast wave and transmits it using an object carousel, and a digital television reception device receives and executes the application.

By executing such an application, the digital television reception device can achieve various functions which are unavailable to conventional television reception devices. As one example, an interactive television system can be realized whereby the digital television reception device transmits information which is collected by an application in conjunction with a broadcast program received from a broadcast wave, to a broadcast station via a network such as the Internet.

However, if unrestricted access to resources, such as use of a file system in the digital television reception device and connection to the network, is granted to the application, the user may suffer damage or a control system in the digital television reception device may be adversely affected in a case when the application contains malicious code. For instance, executing an application containing malicious code may cause a channel switch to occur during viewing, or information stored in the digital television reception device to be leaked out or destroyed. To avoid this, Section 12 "Security" of the MHP specification defines how to execute applications securely.

According to this section, there are two types of applications: an unsigned application which need not be authenticated; and a signed application which need be authenticated.

The unsigned application is executed without being authenticated, but, in order to protect the system, prohibited from such access to resources that may adversely affect the system.

The signed application is permitted to access more resources than the unsigned application. Before activation, however, authentication is performed on the signed application by identifying a transmitter of the application using an X.509 certificate and checking whether the application has been tampered with based on hash values. Only when the authentication is successful, the signed application is activated. Thus, the system is protected by executing only signed applications that are authenticated as valid applications sent from trusted transmitters.

This technique, however, has the following problem. Though the signed application delivers higher functions than the unsigned application, the signed application cannot be activated promptly as it needs to be authenticated first. This arises the demand for a technique of activating high-function applications more speedily.

DISCLOSURE OF THE INVENTION

The present invention aims to provide an application execution device, an application execution method, an integrated circuit for an application execution device, and a computer-readable program that can speed up activation of high-function applications while maintaining security.

The stated aim can be achieved by an application execution device including: an acquisition unit operable to acquire an application program which includes instructions to access resources; a judgment unit operable to judge whether the acquired application program has been tampered with; a tentative permission setting unit operable to obtain tentative permission information showing permission to access only a first resource; a definite permission setting unit operable to obtain definite permission information showing permission to access the first resource and a second resource; and an execution unit operable to start executing the application program within a range of the permission shown by the tentative permission information, before the judgment unit completes the judgment, and after the judgment unit completes the judgment, continue executing the application program within a range of the permission shown by the definite permission information if the application program is judged as having been untampered with.

According to the above construction, the application execution device can activate the application program without a wait time for the tamper check to be completed. If the application program is judged as having been untampered with as a result of the tamper check, the application program is granted access to not only the first resource but also the second resource. This makes it possible to realize high-function application programs that require access to the second resource.

Therefore, high-function application programs can be activated promptly while maintaining high security.

Here, the execution unit may assume a file size of the application program to be zero, if the application program is judged as having been tampered with.

According to the above construction, the file size of the application program is assumed to be zero if the application program is judged as having been tampered with. This prevents the application program from being further executed.

In this way, high security can be maintained even when the application program has been tampered with to contain such an instruction to access the second resource that may adversely affect the device.

Here, the execution unit may start executing the application program before the acquisition unit completes the acquisition of the application program.

According to the above construction, the application execution device can activate the application program without a wait time for the acquisition of the application program to be completed.

This enables the application program to be activated more promptly.

Here, the acquisition unit may acquire the application program by receiving a digital stream which carries the application program.

According to the above construction, the application execution device can activate the application program without waiting for the acquisition of the application program to be completed, when it takes a long time to acquire the application program due to a low transmission rate of the digital stream.

Therefore, the application program can be activated promptly regardless of the transmission rate of the digital stream which carries the application program.

Here, the digital stream may be a transport stream of digital television broadcasting, wherein the application program is multiplexed in the transport stream using an object carousel.

A time period required for a digital television reception device to acquire an application program of, for example, 100,000 steps which is transmitted in a transport stream using an object carousel is about 20 seconds which correspond to one cycle of the object carousel. This means at least 20 seconds are necessary before completion of tamper check that needs to be performed on the whole application program. The application execution device having the above construction can activate the application program, without such a wait time for the acquisition of the application program to be completed.

Therefore, the activation of the application program can be speeded up by the time period from when part of the application program needed for the activation is acquired to when the whole application program is acquired.

Here, the first resource may be a resource which an unsigned application is permitted to access in MHP.

According to the above construction, the application program is granted access to the first resource which conventional unsigned application programs are permitted to access in MHP, before the completion of the tamper check. Meanwhile, the application program is prohibited to access the second resource which the conventional unsigned application programs are prohibited to access in MHP due to the risk of adversely affecting the device, until the completion of the tamper check.

Therefore, the same level of security as that of conventional unsigned application programs can be maintained until the completion of the tamper check.

Here, the application execution device may further include: a transmitter identification unit operable to identify a transmitter of the application program based on transmitter information for identifying the transmitter, wherein the object carousel contains the transmitter information in addition to the application program, the acquisition unit further acquires the transmitter information, and the execution unit starts executing the application program after the transmitter identification unit completes the identification of the transmitter.

According to the above construction, the application execution device does not activate the application program until the transmitter is identified. This prevents execution of an application program sent from an untrusted transmitter, with it being possible to enhance security.

Here, the acquisition unit may further acquire an application identifier showing a type of the application program, wherein the execution unit starts executing the application program before the judgment unit completes the judgment, if the type shown by the acquired application identifier matches a predetermined type.

According to the above construction, the application execution device activates the application program before the completion of the tamper check, depending on the type of the application program.

In this way, the new type of application program according to the present invention can be processed differently from a conventional signed application program that cannot be activated until the completion of the tamper check.

Here, when the execution unit, in a process of executing the instructions included in the application program, reaches an instruction to access the second resource but the judgment unit has not completed the judgment, the execution unit may wait until the judgment unit completes the judgment.

According to the above construction, the application program is prohibited to access the second resource until the completion of the tamper check. High security is maintained by such prohibiting access to the second resource that may adversely affect the device. After the tamper check is completed and the application program is judged as having been untampered with, the application program is granted access to the second resource. This makes it possible to realize high-function application programs.

Here, the application program may include hash information showing a hash value of the application program, wherein the judgment unit judges whether the acquired application program has been tampered with, by calculating a hash value of the acquired application program and comparing the calculated hash value with the hash value shown by the hash information.

According to the above construction, the comparison of the hash values results in a mismatch if at least one part of the application program has been tampered with. Hence tampering of the application can be detected precisely, with it being possible to achieve high security.

Here, the acquisition unit may acquire the application program through one of a plurality of acquisition paths which have different levels of risk of tampering, wherein the tentative permission setting unit obtains the tentative permission information corresponding to the acquisition path of the application program, and when the acquisition path of the application program has a lower level of risk of tampering, the tentative permission information corresponding to the acquisition path shows the permission to access the first resource including a resource an access to which has a higher risk of adversely affecting the application execution device.

According to the above construction, when the application program is acquired from a secure acquisition path that has a lower level of risk of tampering, the application program is granted access to more resources including a resource that has a risk of adversely affecting the device. This enables more instructions in the application program to be carried out, so that the tamper check has more likely been completed by the time the execution unit reaches an instruction to access the second resource.

This reduces the need to wait for the completion of the tamper check. Accordingly, the user can use the application program without discomfort, while maintaining high security.

Here, when the acquisition path of the application program has the lower level of risk of tampering, the application program may be in encrypted form, wherein when the acquisition path of the application program has a higher level of risk of tampering, the application program is in unencrypted form.

According to the above construction, when the application program is acquired in encrypted form, the application program is granted access to more resources including a resource that has a risk of adversely affecting the device. This enables more instructions in the application program to be carried out.

As a result, the need to wait for the completion of the tamper check decreases. Accordingly, the user can use the application program without discomfort, while maintaining high security.

Here, the acquisition unit may acquire the application program through one of a plurality of acquisition paths which have different time periods required for acquiring an application program, wherein the tentative permission setting unit obtains the tentative permission information corresponding to the acquisition path of the application program, and when the acquisition path of the application program has a longer time period required, the tentative permission information corresponding to the acquisition path shows the permission to access the first resource including a resource an access to which has a higher risk of adversely affecting the application execution device.

When the application program is acquired from an acquisition path that has a longer time period required for acquisition of an application program, it takes a longer time before the completion of the tamper check. According to the above construction, such an application program is granted access to more resources including a resource that has a risk of adversely affecting the device, before the completion of the tamper check. This enables more instructions in the application program to be carried out, so that the tamper check has more likely been completed by the time the execution unit reaches an instruction to access the second resource.

As a result, the need to wait for the completion of the tamper check decreases. Accordingly, the user can use the application program without discomfort, even when the acquisition of the application program takes a long time.

Here, the application execution device may further include: a signed application execution unit operable to start executing the application program after the judgment unit completes the judgment, if the acquisition unit acquires the application program by reading the application program from a recording medium and the judgment unit judges that the application program has been untampered with, wherein the execution unit starts executing the application program before the judgment unit completes the judgment, if the acquisition unit acquires the application program by receiving a digital stream which carries the application program.

It takes only a short time to acquire the application program from the recording medium and therefore to perform tamper check on the application program. In this case, the application execution device having the above construction activates the application program after the completion of the tamper check, in the same way as conventional signed application programs. As a result, the same level of security as that of conventional signed application programs is attained.

Meanwhile, it takes a long time to acquire the application program from the digital stream and therefore to perform tamper check on the application program. In such a case, the application execution device activates the application program with grant of access to only the first resource, without waiting for the completion of the tamper check. After the tamper check is completed and the application program is judged as having been untampered with, the application program is further granted access to the second resource, as a result of which an instruction to access the second resource can be carried out. In so doing, the activation of the application program is accelerated while maintaining security.

The stated aim can also be achieved by an integrated circuit including: an acquisition unit operable to acquire an application program which includes instructions to access resources; a judgment unit operable to judge whether the acquired application program has been tampered with; a tentative permission setting unit operable to obtain tentative permission information showing permission to access only a first resource; a definite permission setting unit operable to obtain definite permission information showing permission to access the first resource and a second resource; and an execution unit operable to start executing the application program within a range of the permission shown by the tentative permission information, before the judgment unit completes the judgment, and after the judgment unit completes the judgment, continue executing the application program within a range of the permission shown by the definite permission information if the application program is judged as having been untampered with.

According to the above construction, the integrated circuit can activate the application program without a wait time for the tamper check to be completed. If the application program is judged as having been untampered with as a result of the tamper check, the application program is granted access to not only the first resource but also the second resource. This makes it possible to realize high-function application programs that require access to the second resource.

Therefore, high-function application programs can be activated promptly while maintaining high security.

The stated aim can also be achieved by an application execution method including: an acquisition step of acquiring an application program which includes instructions to access resources; a judgment step of judging whether the acquired application program has been tampered with; a tentative permission setting step of obtaining tentative permission information showing permission to access only a first resource; a definite permission setting step of obtaining definite permission information showing permission to access the first resource and a second resource; and an execution step of starting executing the application program within a range of the permission shown by the tentative permission information, before the judgment step completes the judgment, and after the judgment step completes the judgment, continuing executing the application program within a range of the permission shown by the definite permission information if the application program is judged as having been untampered with.

According to the above method, the application program can be activated without a wait time for the tamper check to be completed. If the application program is judged as having been untampered with as a result of the tamper check, the application program is granted access to not only the first resource but also the second resource. This makes it possible to realize high-function application programs that require access to the second resource.

Therefore, high-function application programs can be activated promptly while maintaining high security.

The stated aim can also be achieved by a computer-readable program causing a computer to perform: an acquisition step of acquiring an application program which includes instructions to access resources; a judgment step of judging whether the acquired application program has been tampered with; a tentative permission setting step of obtaining tentative permission information showing permission to access only a first resource; a definite permission setting step of obtaining definite permission information showing permission to access the first resource and a second resource; and an execution step of starting executing the application program within a range of the permission shown by the tentative permission information, before the judgment step completes the judgment, and after the judgment step completes the judgment, continuing executing the application program within a range of the permission shown by the definite permission information if the application program is judged as having been untampered with.

According to the above program, the application program can be activated without a wait time for the tamper check to be completed. If the application program is judged as having been untampered with as a result of the tamper check, the application program is granted access to not only the first resource but also the second resource. This makes it possible to realize high-function application programs that require access to the second resource.

Therefore, high-function application programs can be activated promptly while maintaining high security.

BRIEF DESCRIPTION OF DRAWINGS

FIG. 9 shows access permission specified for an unsigned application and a signed application according to MHP.

FIG. 10 shows a hardware construction of the digital television reception device shown in FIG. 1.

BEST MODE FOR CARRYING OUT THE INVENTION

First Embodiment

The following describes the first embodiment of an application execution device of the present invention. In the first embodiment, a digital television reception device which acquires an application from a broadcast wave and executes the application is used as an example of the application execution device.

Figure 1:
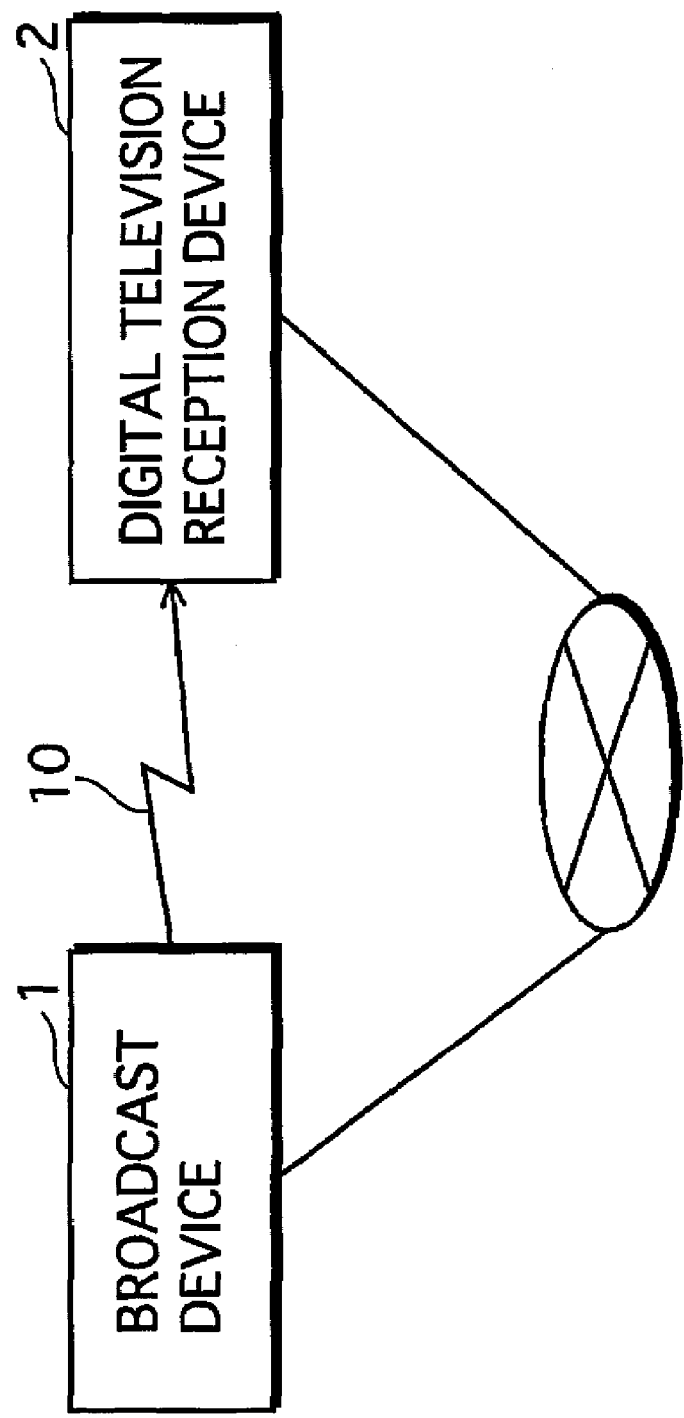
FIG. 1 shows a construction of an interactive television system including a digital television reception device to which the first embodiment of the present invention relates.

FIG. 1 shows a construction of an interactive television system which includes the digital television reception device of the first embodiment.

In the drawing, a broadcast device 1 is installed in a digital television broadcast station. The broadcast device 1 transmits transmission data 10 of digital television broadcasting, and receives information from a digital television reception device 2 via a network such as the Internet.

The digital television reception device 2 is used by a viewer of digital television broadcasting. The digital television reception device 2 receives the transmission data 10 of digital television broadcasting from the broadcast device 1. The digital television reception device 2 has a function of playing back a broadcast program included in the transmission data 10, and a function of executing an application included in the transmission data 10. Through the execution of the application, the digital television reception device 2 transmits the information to the broadcast device 1 via the network. In this way, an interactive service is achieved.

Figure 2:
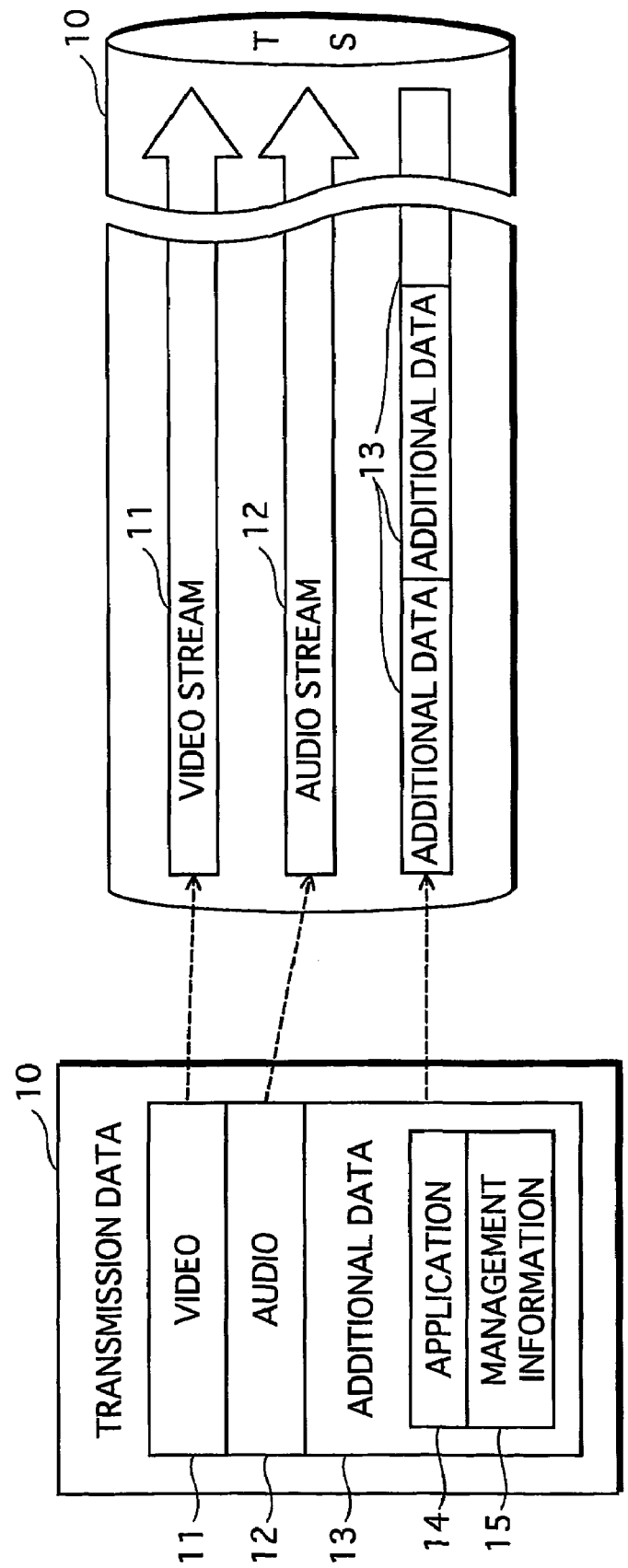
FIG. 2A shows a structure of transmission data.
FIG. 2B is a representation of a transport stream carrying the transmission data shown in FIG. 2A.

FIG. 2A shows a structure of the transmission data 10 that is transmitted from the broadcast device 1. As illustrated, the transmission data 10 is roughly made up of video data 11 and audio data 12 of the broadcast program, and additional data 13. The transmission data 10 is actually realized by an MPEG2 transport stream which is generated by multiplexing a stream of the video data 11, a stream of the audio data 12, and the additional data 13 in DSM-CC sections carried by an object carousel, as shown in FIG. 2B. MPEG2 transport streams and DSM-CC are described in detail in the MPEG specifications ISO/IEC 138181-1 and 138181-6 respectively, so that their explanation has been omitted here.

The additional data 13 includes an application 14 which is a program written in Java (registered trademark), and management information 15 for the application 14. Since the object carousel is used for the additional data 13, the same information is cyclically transmitted. This being so, regardless of when the viewer selects a channel corresponding to the transmission data 10, the digital television reception device 2 can acquire the whole additional data 13 within a predetermined time period.

Figure 3:
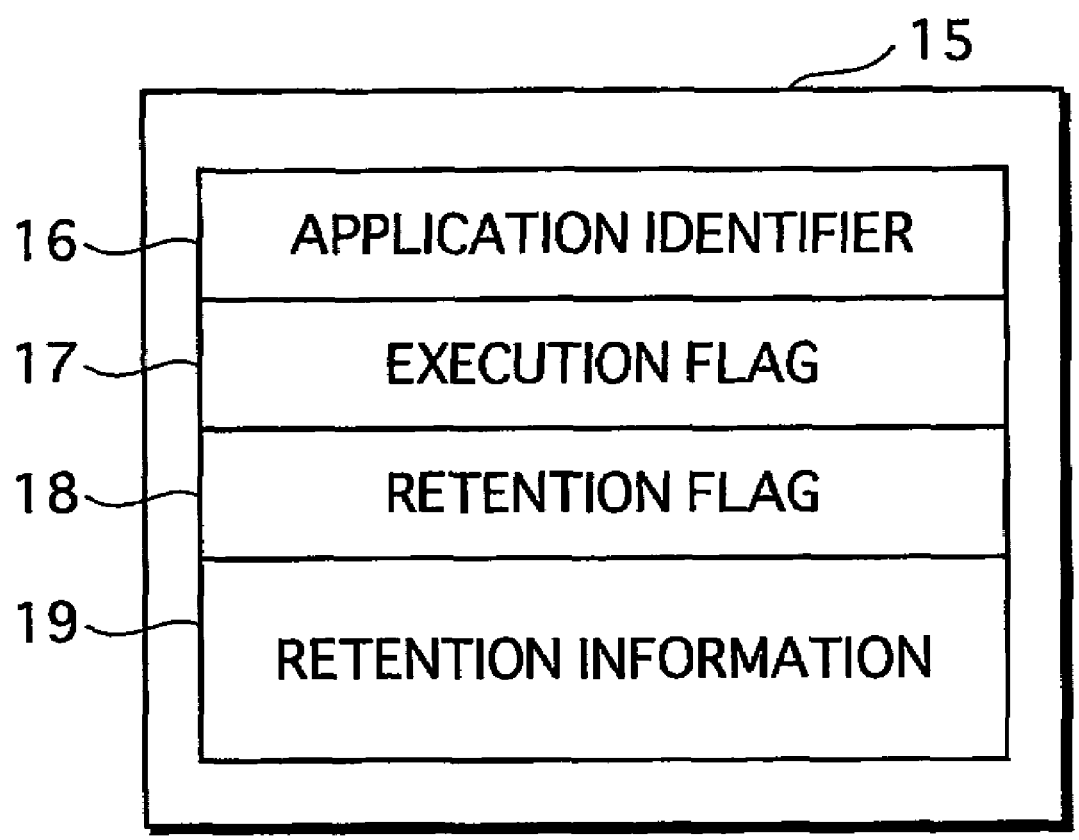
FIG. 3 is a representation of a data structure of management information shown in FIG. 2.

FIG. 3 is a representation of a data structure of the management information 15.

In the drawing, the management information 15 includes an application identifier 16, an execution flag 17, a retention flag 18, and retention information 19.

The application identifier 16 takes one of the values 0x0000 to 0xFFFF, and uniquely identifies the application 14. When the application identifier 16 is in a range of 0x0000 to 0x3FFF, the application 14 is an unsigned application defined in MHP. When the application identifier 16 is in a range of 0x4000 to 0x7FFF, the application 14 is a signed application defined in MHP. When the application identifier 16 is in a range of 0x8000 to 0xFFFF, the application 14 is a tentative unsigned application which is a new type of application according to the this embodiment.

Figure 4:
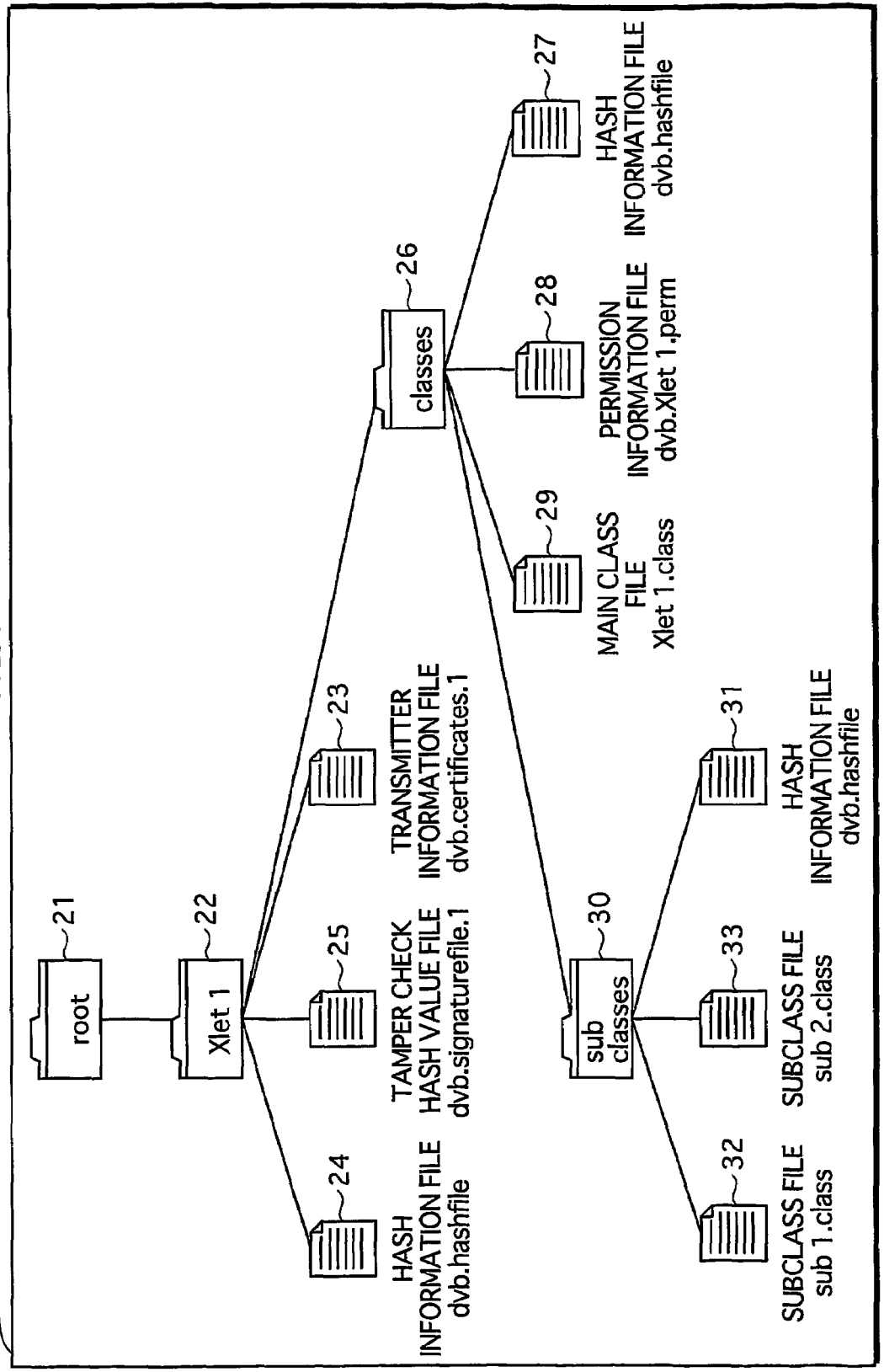
FIG. 4 is a representation of a directory structure of an application shown in FIG. 2.

FIG. 4 is a representation of a directory structure of the application 14. In the drawing, the application 14 has an application directory 22 below a root directory 21. The application directory 22 contains a transmitter information file 23, a hash information file 24 for the application directory 22, a tamper check hash value file 25, and a main class directory 26.

The main class directory 26 contains a hash information file 27 for the main class directory 26, a permission information file 28, a main class file 29, and a subclass directory 30. The subclass directory 30 contains a hash information file 31 for the subclass directory 30, and subclass files 32 and 33.

Figure 5:
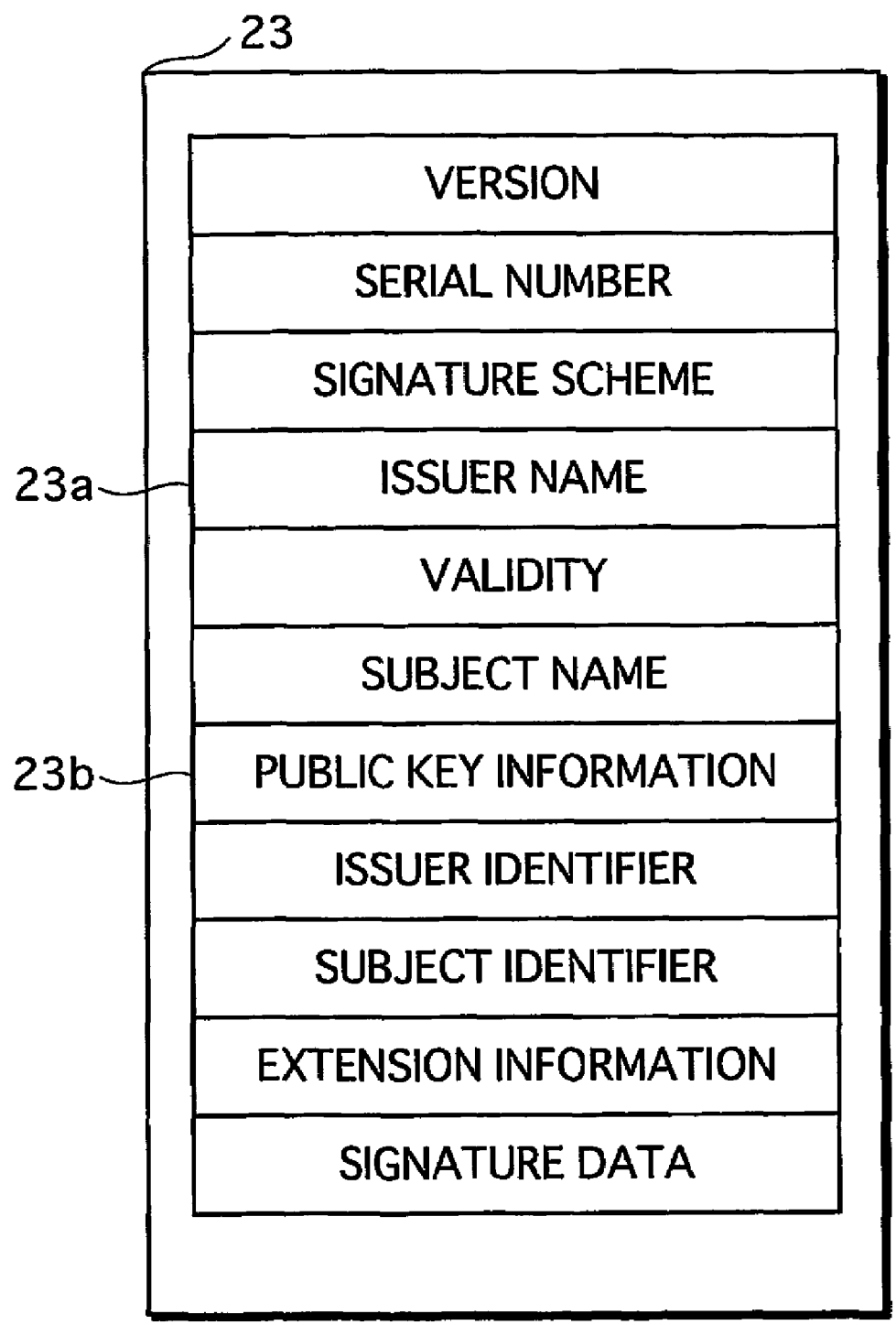
FIG. 5 shows a data structure of a transmitter information file shown in FIG. 4.

FIG. 5 shows a data structure of the transmitter information file 23 shown in FIG. 4 in detail. This transmitter information file 23 is an X.509 certificate for attesting to the identity of the transmitter of the application 14. In the X.509 certificate, an issuer name 23a shows a name of the transmitter, and public key information 23b shows a public key which is used to decrypt signature data in the tamper check hash value file 25. X.509 is described in detail in RFC 2459 and the like, so that its explanation has been omitted here.

Figure 6:
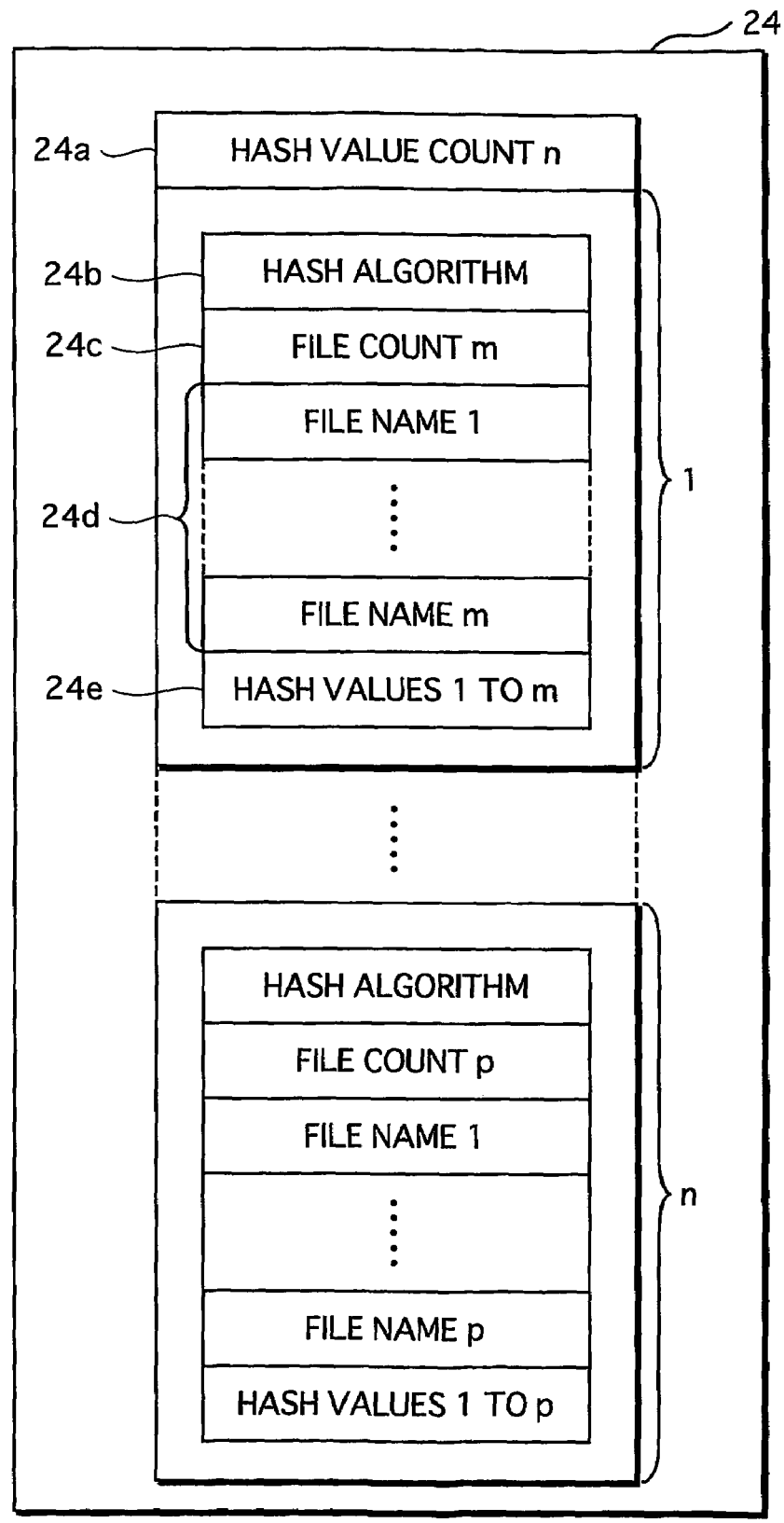
FIG. 6 shows a data structure of a hash information file shown in FIG. 4.

FIG. 6 shows a data structure of the hash information file 24 shown in FIG. 4, in detail. The hash information file 24 includes a hash value count 24a showing a number of hash values, and a plurality of information sets corresponding one-to-one with the hash values. Each of the information sets is made up of a hash algorithm 24b; a file count 24c showing a number of files, file names 24d of the files, and hash values 24e calculated from the files.

Figure 7:
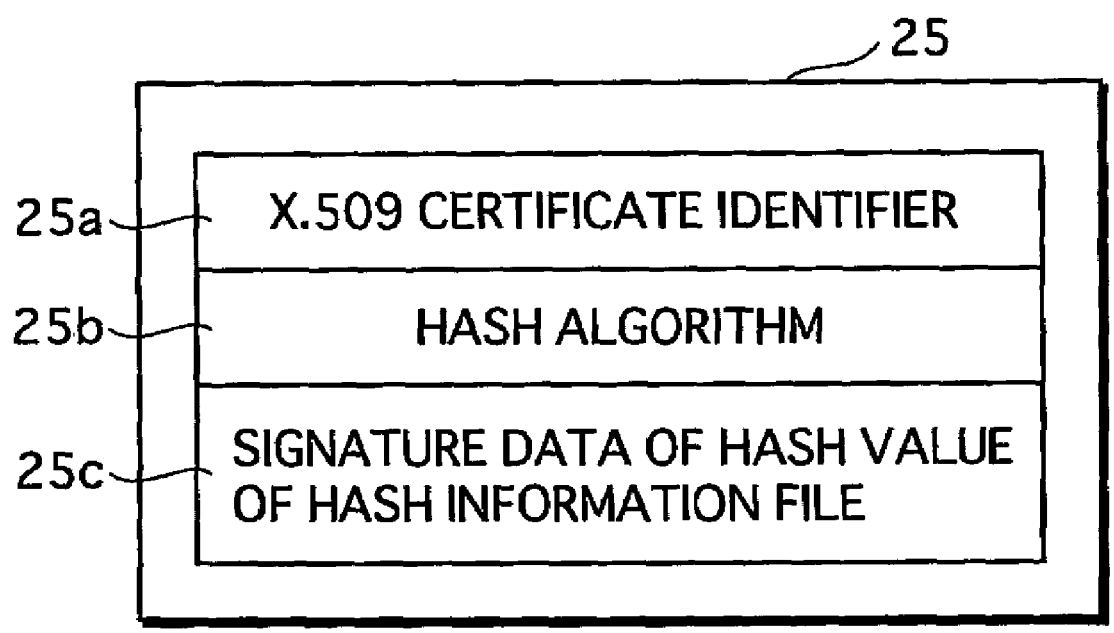
FIG. 7 shows a data structure of a tamper check hash value file shown in FIG. 4.

FIG. 7 shows a data structure of the tamper check hash value file 25 shown in FIG. 4, in detail. The tamper check hash value file 25 includes an X.509 certificate identifier 25a, a hash algorithm 25b, and signature data 25c. The signature data 25c is generated by encrypting a hash value calculated from the hash information file 24, using a secret key corresponding to the public key shown in the public key information 23b in the transmitter information file 23.

Figure 8:
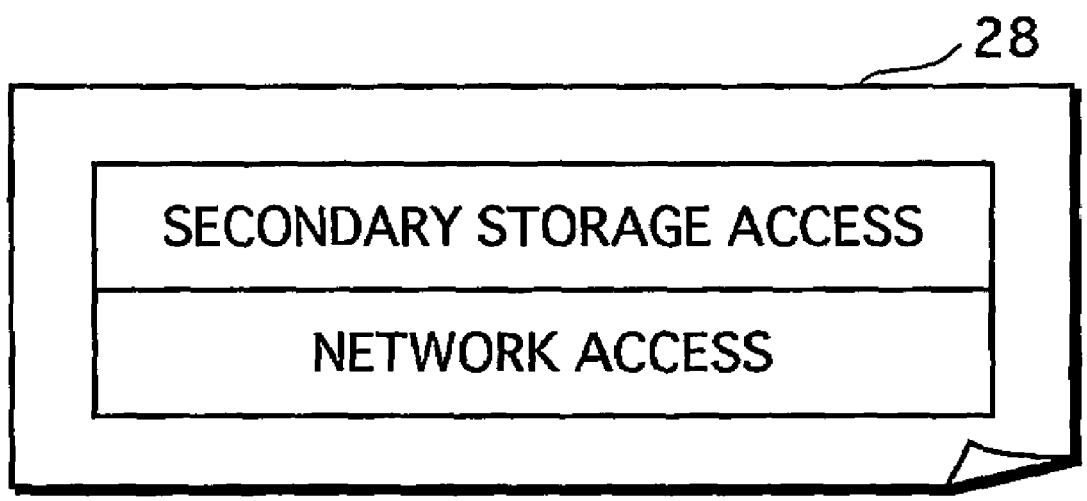
FIG. 8 shows an example of permission information file shown in FIG. 4.

FIG. 8 shows an example of the permission information file 28 shown in FIG. 4. The permission information file 28 shows, in XML, permission to access resources which are required in execution of the application 14. In more detail, the permission information file 28 shows permission to access one or more sources which belong to an additional permission group shown in FIG. 9. The application 14 is permitted to access the resources shown by the permission information file 28, if the application 14 is judged as having been transmitted from a trusted transmitter and having been untampered with, in the digital television reception device 2. XML is described in detail in RFC 3023 and the like, and so its explanation has been omitted here.

A hardware construction of the digital television reception device 2 is described below.

FIG. 10 shows the hardware construction of the digital television reception device 2. As shown in the drawing, the digital television reception device 2 includes a TS decoder 101, an audio decoder 102, a video decoder 103, a speaker 104, a display 105, an image output unit 106, a CPU 107, a network device 108, an input unit 109, a primary storage unit 110, a secondary storage unit 111, and a ROM 112.

In this digital television reception device 2, the TS decoder 101 demultiplexes the MPEG transport stream carrying the transmission data 10, and the video decoder 103 and the audio decoder 102 respectively decode the video data 11 and the audio data 12 obtained by the TS decoder 101 and output the decoded video data and audio data to the display 105 and the speaker 104. In this way, the digital television reception device 2 plays back the broadcast program.

The image output unit 106 superimposes image data, such as image data of a setting screen for the digital television reception device 2 or image data of a display screen for the application 14, on the decoded video data output from the video decoder 103.

The input unit 109 receives a user operation made by the viewer via a remote control.

The CPU 107 controls the image output unit 106 to update image data according to a user operation received by the input unit 109. In this way, the digital television reception device 2 carries out interactive operations.

The primary storage unit 110 is a working area that is actually realized by a RAM. The application 14 separated from the transmission data 10 is stored into the primary storage unit 110.

The secondary storage unit 111 is a nonvolatile memory contained in a device such as a hard disk or an EEPROM. The secondary storage unit 111 stores a list of trusted transmitters.

The ROM 112 stores a program for controlling the digital television reception device 2. The functions of the digital television reception device 2 are realized by the CPU 107 executing the program in the ROM 112 in conjunction with the hardware resources.

Figure 11:
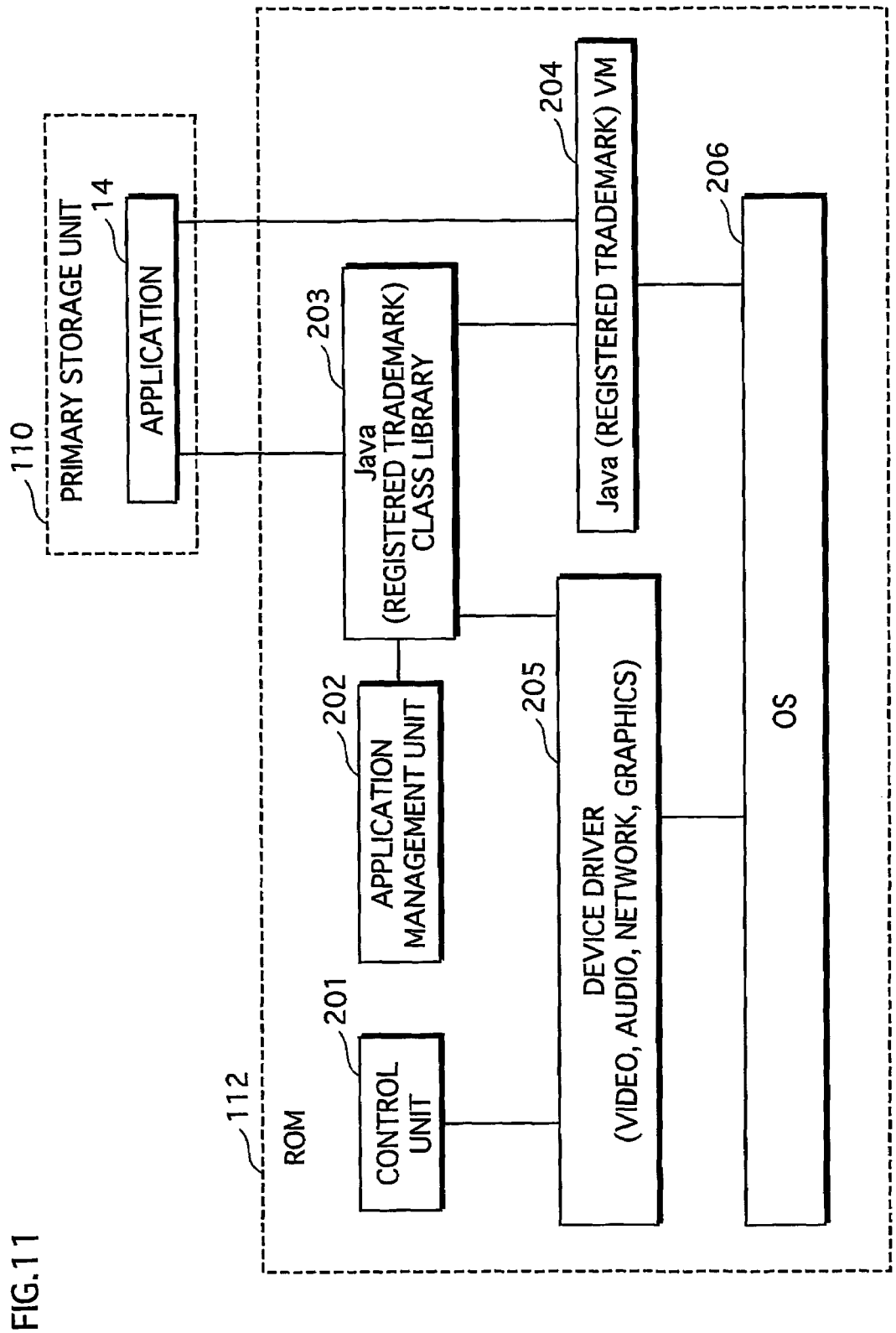
FIG. 11 shows a functional construction of a program stored in a ROM shown in FIG. 10.

FIG. 11 shows a functional construction of the program stored in the ROM 112.

The program stored in the ROM 112 includes a control unit 201, an application management unit 202, a Java (registered trademark) class library 203, a Java (registered trademark) VM 204, a device driver 205, and an OS 206.

The control unit 201 controls the digital television reception device 2 in accordance with a user operation received by the input unit 109.

The device driver 205 includes drivers for the speaker 104, the display 105, the image output unit 106, and the network device 108.

The application management unit 202 and the Java (registered trademark) class library 203 control the execution of the application 14 stored in the primary storage unit 110.

Figure 12:
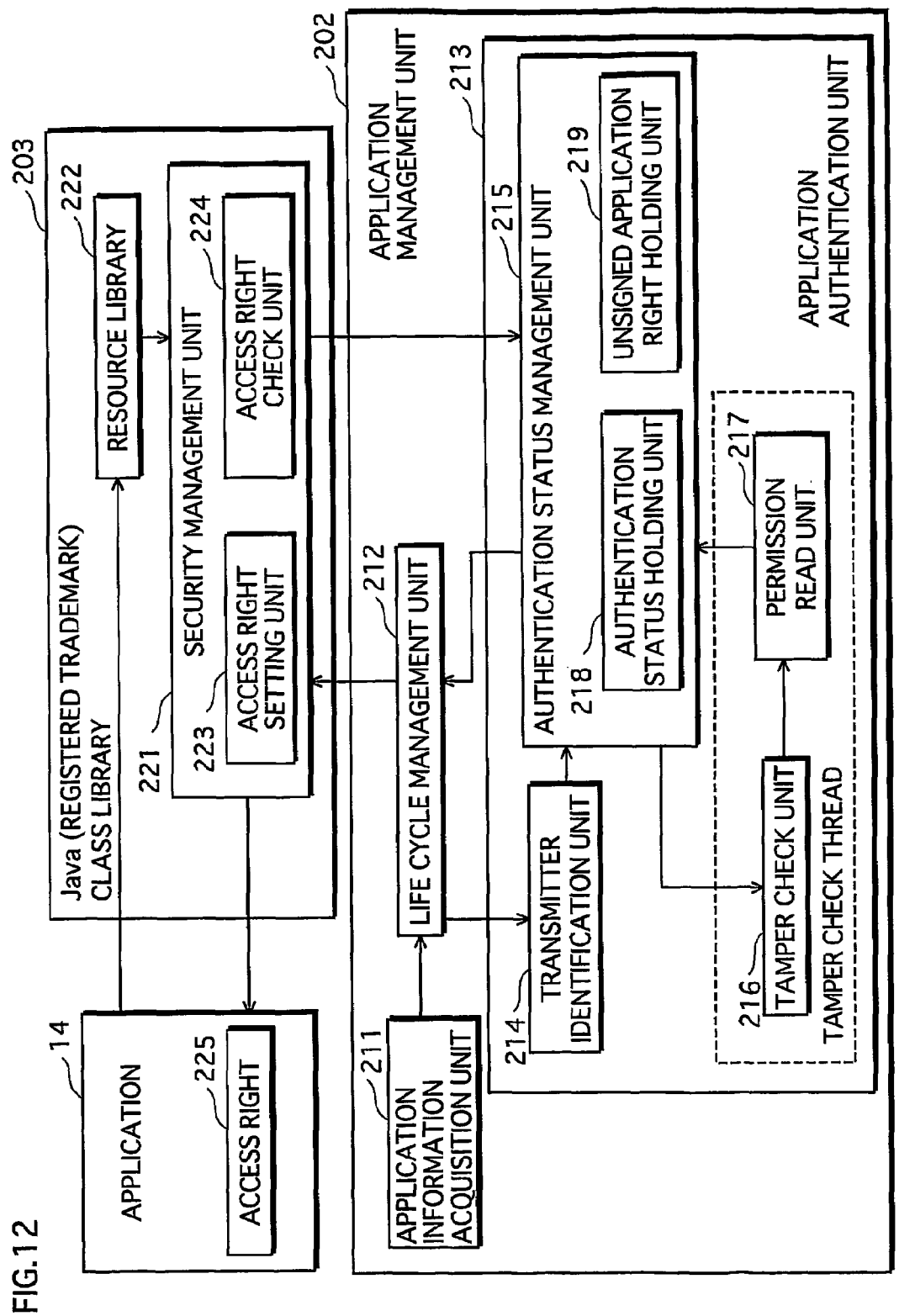
FIG. 12 shows a functional construction for controlling execution of the application.

FIG. 12 shows a functional construction for controlling the execution of the application 14, in detail.

The application management unit 202 includes an application information read unit 211, a life cycle management unit 212, and an application authentication unit 213. The Java (registered trademark) class library 203 includes a security management unit 221 and a resource library 222.

The application information read unit 211 reads the management information 15 included in the additional data 13, from the primary storage unit 110.

The life cycle management unit 212 activates the application 14 according to an activation procedure for one of an unsigned application, a signed application, and a tentative unsigned application, based on the management information 15.

The application authentication unit 213 includes a transmitter identification unit 214, an authentication status management unit 215, a tamper check unit 216, and a permission read unit 217, and authenticates the application 14. The authentication status management unit 215 includes an authentication status holding unit 218 and an unsigned application permission holding unit 219. The unsigned application permission holding unit 219 holds unsigned application permission information which shows permission to access resources that are granted to unsigned applications in MHP (hereafter "unsigned application permission"). For example, the unsigned application permission information is realized by writing the unsigned application permission in XML.

MHP prohibits an unsigned application to access predetermined resources. In more detail, an unsigned application is prohibited to access resources indicated by the mark "X" in FIG. 9. On the other hand, a signed application is granted unrestricted access to resources specified by a permission information file contained in the application.

A tentative unsigned application according to this embodiment is activated with grant of the unsigned application permission, without waiting for the tamper check of the application to be completed. This being so, the tentative unsigned application is prohibited from accessing the predetermined resources in the same manner as an unsigned application, until the tamper check is completed. After the tamper check is completed and the tentative unsigned application is judged as being a valid application, the tentative unsigned application is granted unrestricted access to resources specified by a permission information file contained in the application, in the same manner as a signed application.

In the Java (registered trademark) class library 203, the security management unit 221 includes a permission setting unit 223 and a permission check unit 224, and controls the range of resources which the application 14 is permitted to access.

An operation of the digital television reception device 2 having the above construction is described below, by referring to FIGS. 13 to 15. Here, automatic execution of the application 14 which occurs as a result of a channel switch is used as an example operation of the digital television reception device 2.

Figure 13:
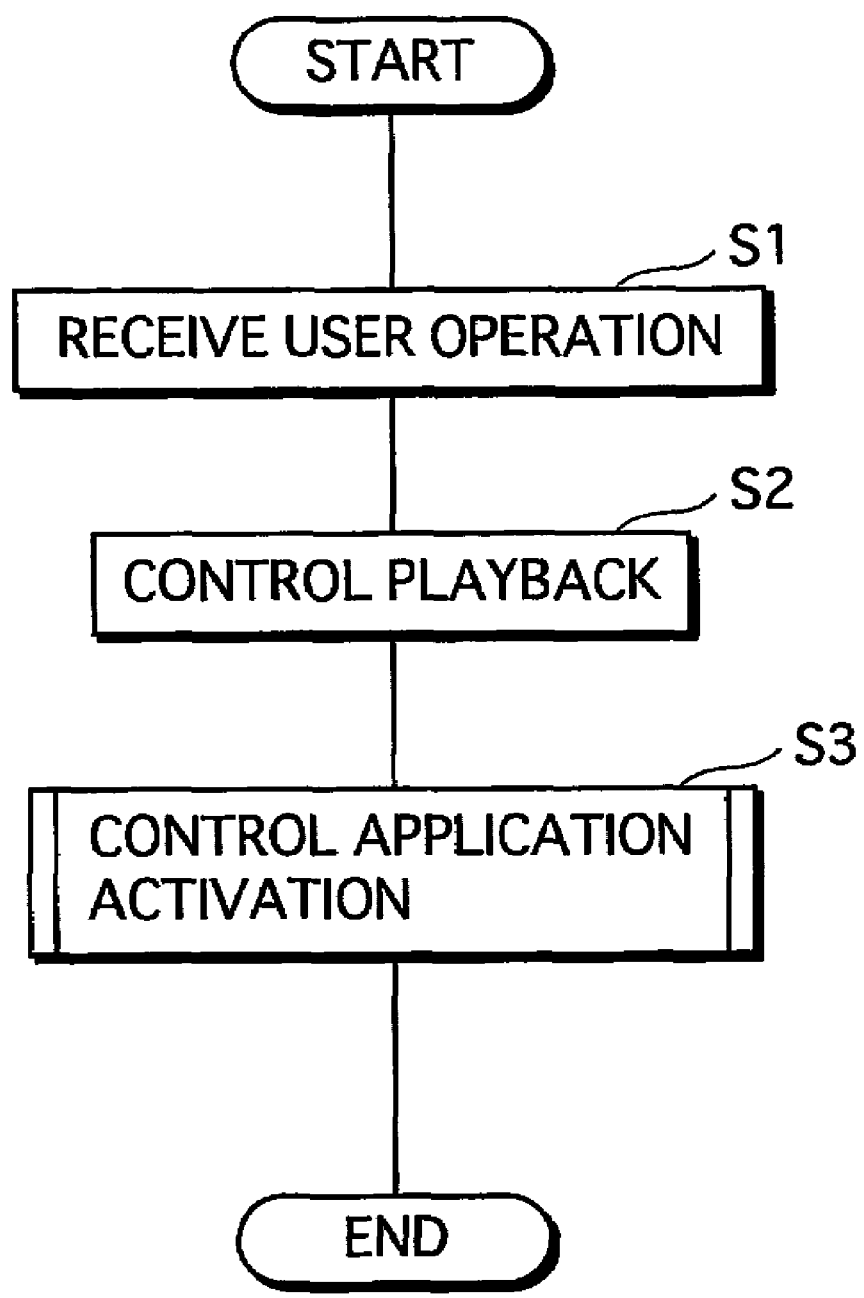
FIG. 13 is a flowchart showing a channel selection procedure in the digital television reception device.
Figure 14:
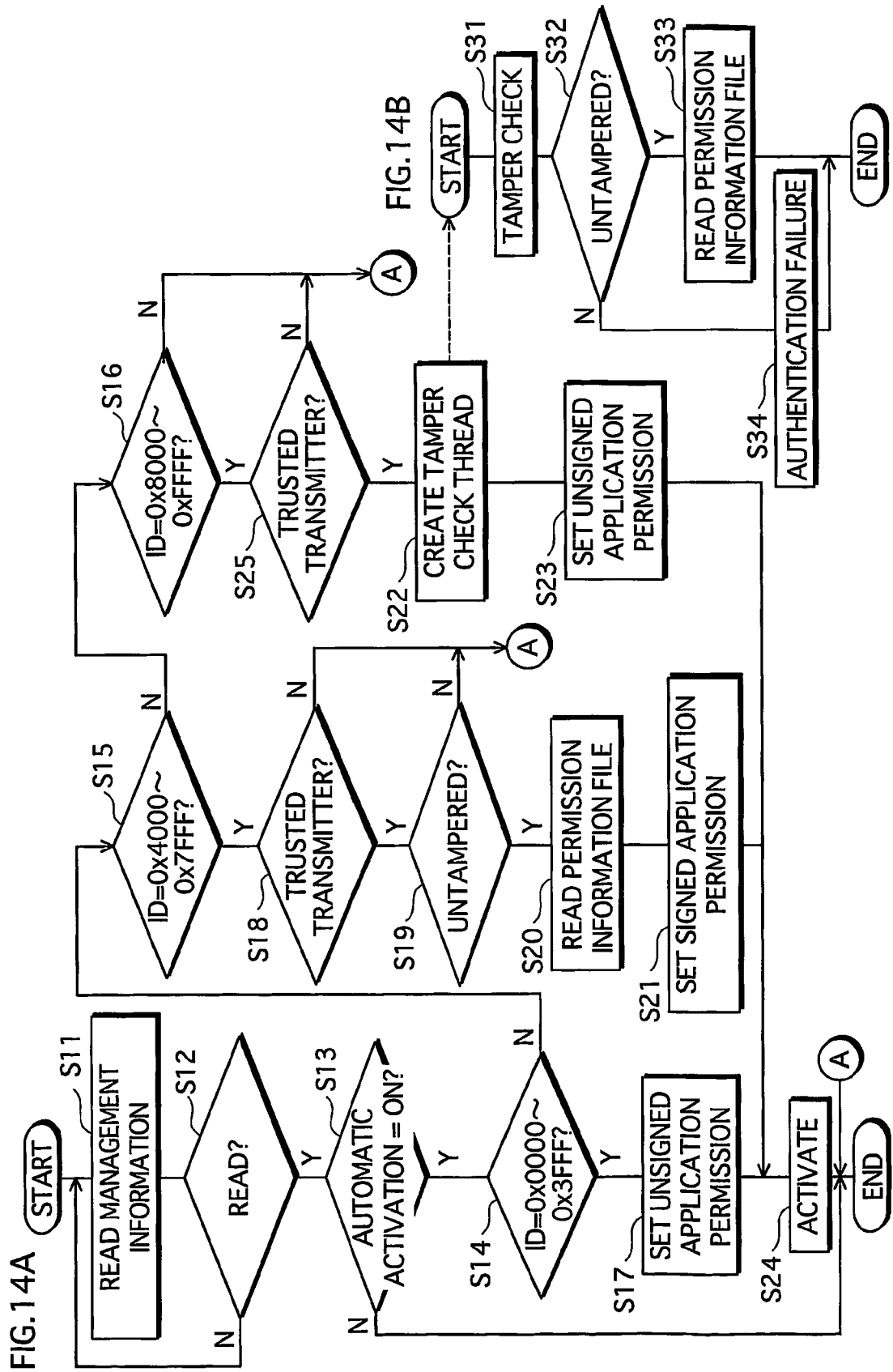
FIG. 14A is a flowchart showing an application activation control procedure in the digital television reception device.
FIG. 14B is a flowchart showing a procedure of a tamper check thread created in step S22 in FIG. 14A.

FIG. 13 is a flowchart showing a channel selection procedure in the digital television reception device 2.

Upon receiving a user operation of switching to the channel corresponding to the transmission data 10 from the input unit 109 (S1), the control unit 201 instructs the TS decoder 101 to switch to the channel and demultiplex the transport stream carrying the transmission data 10. The control unit 201 then instructs the video decoder 103 and the audio decoder 102 to play back the video data 11 and the audio data 12, via the device driver 205 (S2). The control unit 201 further instructs the TS decoder 101 to store the additional data 13 taken from the transmission data 10 into the primary storage unit 110, and instructs the application management unit 202 to control the activation of the application 14 (S3). In response to the instruction to store the additional data 13, the TS decoder 101 acquires the object carousel carrying the additional data 13 from the transmission data 10, and sequentially stores the acquired additional data 13 to the primary storage unit 110. When one cycle of object carousel (e.g. about 20 seconds) has elapsed since the receipt of the instruction, the whole additional data 13 is acquired in the primary storage unit 110. This completes the channel selection procedure in the digital television reception device 2.

FIG. 14A is a flowchart showing an application activation control procedure in the digital television reception device 2.

Upon receiving the instruction to control the activation of the application 14 from the control unit 201 in step S3 in FIG. 13, the application information read unit 221 in the application management unit 202 reads the management information 15 from the additional data 13 stored in the primary storage unit 110 (S11). Here, it is unknown from which part of the object carousel the TS decoder 101 starts acquiring the additional data 13 when the viewer selects the channel corresponding to the transmission data 10. This means there is a possibility that the management information 15 may not be present yet in the primary storage unit 110 when the application information read unit 211 attempts to read the management information 15 (S12: NO). In such a case, the application information read unit 211 repeats the attempt to read the management information 15 until the TS decoder 101 receives a module containing the management information 15. After reading the management information 15 (S12: YES), the application information read unit 211 passes the read management information 15 to the life cycle management unit 212.

The life cycle management unit 212 receives the management information 15, and judges whether to automatically activate the application 14 (S13). In more detail, the life cycle management unit 212 checks the execution flag 17 in the management information 15. If the execution flag 17 is OFF (S13: NO), the life cycle management unit 212 judges that the application 14 is not to be automatically activated, and ends the procedure. If the execution flag 17 is ON (S13: YES), the life cycle management unit 212 judges that the application 14 is to be automatically activated. In steps S14 to S16 which follow, the life cycle management unit 212 judges whether the application 14 is an unsigned application, a signed application, or a tentative unsigned application, based on the application identifier 16 in the management information 15.

If the application identifier 16 is in the range of 0x0000 to 0x3FFF (S14: YES), the life cycle management unit 212 judges the application 14 as being a conventional unsigned application. In this case, the life cycle management unit 212 reads the unsigned application permission information from the unsigned application permission holding unit 219, and passes the unsigned application permission information to the permission setting unit 223 in the security management unit 221 in the Java (registered trademark) class library 203. The permission setting unit 223 sets the unsigned application permission shown by the unsigned application permission information, as access permission 225 that is granted to the application 14 at the time of activation (S17).

If the application identifier 16 is in the range of 0x4000 to 0x7FFF (S15: YES), the life cycle management unit 212 judges the application 14 as being a conventional signed application, and instructs the application authentication unit 213 to authenticate the application 14. The application authentication unit 213 performs the authentication as follows. First, the transmitter identification unit 214 performs transmitter identification (S18). In detail, the transmitter identification unit 214 reads the transmitter information file 23 shown in FIG. 5 from the primary storage unit 110. If the issuer name 23a in the transmitter information file 23 is included in the list of trusted transmitters which is stored in the secondary storage unit 211 beforehand, the transmitter identification unit 214 judges the transmitter of the application 14 as being a trusted transmitter (S18: YES). Here, the public key information 23b in the transmitter information file 23 which is an X.509 certificate can be used to judge whether the transmitter information file 23 is sent from the transmitter itself.

If the transmitter of the application 14 is judged as being a trusted transmitter, the application authentication unit 213 waits until the whole application 14 is stored in the primary storage unit 110. After this, the tamper check unit 216 performs tamper check on the application 14 (S19). This tamper check can be conducted in the following manner. For each of the application directory 22, the main class directory 26, and the subclass directory 30, the tamper check unit 216 calculates a hash value from each file contained in the directory, and compares the calculated hash values with hash values shown in one of the hash information files 24, 27 and 31 that belongs to the directory. Further, the tamper check unit 216 calculates a hash value from the hash information file 24, decrypts the signature data 25c in the tamper check hash value file 25 using the public key shown in the public key information 23b in the transmitter information file 23 to obtain a hash value, and compares the two hash values. If all of the above comparisons result in a match, the tamper check unit 216 judges the application 14 as having been untampered with. If any of the above comparisons results in a mismatch, on the other hand, the tamper check unit 216 judges the application 14 as having been tampered with. If the application 14 is judged as having been untampered with (S19: YES), the tamper check unit 216 notifies the authentication success to the permission read unit 217. The permission read unit 217 responsively reads the permission information file 28 from the primary storage unit 110 (S20). Here, if the permission read unit 217 cannot read the permission information file 28 because the permission information file 28 is not contained in the application 14 in the first place, the permission read unit 217 instead reads the unsigned application permission information from the unsigned application permission holding unit 219.

The permission read unit 217 passes the read permission information file 28 to the permission setting unit 223 in the security management unit 221 via the life cycle management unit 212. The permission setting unit 223 sets the signed application permission shown by the permission information file 28, as the access permission 225 (S21).

Meanwhile, if the transmitter is judged as not being a trusted transmitter (S18: NO) or if the application 14 is judged as having been tampered with (S19: NO), the application authentication unit 213 notifies the authentication failure to the life cycle management unit 212. The life cycle management unit 212 accordingly ends the procedure without activating the application 14.

If the application identifier 16 is in the range of 0x8000 to 0XFFFF (S16: YES), the life cycle management unit 212 judges the application 14 as being a tentative unsigned application which is the new type of application according to this embodiment, and instructs the application authentication unit 213 to authenticate the application 14. The application authentication unit 213 waits until the TS decoder 101 receives the transmitter information file 23 and stores it into the primary storage unit 110. Once the transmitter information file 23 has been stored into the primary storage unit 110, the transmitter identification unit 214 performs the same transmitter identification as in step S18 (S25). If the transmitter of the application 14 is judged as being a trusted transmitter (S25: YES), the application authentication unit 213 instructs the tamper check unit 216 and the permission read unit 217 to create a tamper check thread (S22), and also notifies the life cycle management unit 212 that the transmitter of the application 14 is a trusted transmitter. Upon being notified, the life cycle management unit 212 reads the unsigned application permission information from the unsigned application permission holding unit 219, and passes the unsigned application permission information to the permission setting unit 223 in the security management unit 221. The permission setting unit 223 sets the unsigned application permission shown by the unsigned application permission information, as the access permission 225 (S23). If the transmitter of the application 14 is judged as not being a trusted transmitter (S25: NO), meanwhile, the application authentication unit 213 notifies the life cycle management unit 212 that the transmitter of the application 14 is not a trusted transmitter. The life cycle management unit 212 accordingly ends the procedure without activating the application 14.

After the access permission 225 is set in any of steps S17, S21, and S23, the life cycle management unit 212 activates the application 14 using the Java (registered trademark) class library 203 (S24). This completes the application activation control procedure.

With the above procedure, the activation of the application 14 can be accelerated. Suppose the application 14 has a large data size and therefore it takes a long time to acquire one cycle of object carousel containing the application 14 and calculate hash values from the application 14. According to the procedure for a conventional signed application, the application 14 cannot be activated until one cycle of object carousel is acquired and the application 14 is authenticated. According to the procedure for a tentative unsigned application, on the other hand, the application 14 can be activated when part of the object carousel is acquired.

The tamper check thread created by the tamper check unit 216 and the permission read unit 217 in step S22 has the following procedure. Note that this tamper check thread is processed in parallel with the execution of the application 14 which is a tentative unsigned application activated in step S24.

FIG. 14B is a flowchart showing the procedure of the tamper check thread.

After the TS decoder 101 acquires the whole additional data 13 and stores the whole application 14 into the primary storage unit 110, the tamper check unit 216 performs tamper check on the application 14 (S31). If the application 14 is judged as having been untampered with as a result of the tamper check (S32: YES), the tamper check unit 216 notifies this to the permission read unit 217. The permission read unit 217 responsively reads the permission information file 28 from the primary storage unit 110, and passes the permission information file 28 to the authentication status management unit 215. The authentication status management unit 215 registers the permission information file 28 in the authentication status holding unit 218 (S33), before ending the procedure. If the application 14 is judged as having been tampered with (S32: NO), on the other hand, the tamper check unit 216 notifies the authentication status management unit 215 of the authentication failure. The authentication status management unit 215 registers information indicating the authentication failure in the authentication status holding unit 218 (S34), before ending the procedure. This completes the tamper check thread.

MHP stipulates that, when a tamper check on a signed application results in a failure, a file size of that singed application is assumed to be zero. As a result, the signed application is treated as not having any content, though the signed application itself exists. This being so, step S34 performed by the authentication status management unit 215 when notified of the application failure by the tamper check unit 216 may be modified as follows, to make the present invention compliant with MHP. In step S34, the authentication status management unit 215 registers information indicating the authentication failure in the authentication status holding unit 218. In addition, the authentication status management unit 215 changes, in a file system for managing the primary storage unit 110, a file size of each file of the application 14 or a file size of each file in the application 14 for which a calculated hash value and a corresponding hash value in a hash information file results in a mismatch, to zero.

In parallel with this tamper check thread shown in FIG. 14B, the application 14 which is a tentative unsigned application activated in step S24 in FIG. 14A is executed. In the execution of the application 14, the Java (registered trademark) class library 203 judges whether the application 14 is permitted to access a resource requested by the application 14. In the case of a conventional unsigned application or signed application, this judgment is made based on the access permission 225 set in step S17 or S21. In the case of a tentative unsigned application according to this embodiment, the judgment is made based on the access permission 225 set in step S23 until the tamper check is completed. After the tamper check is completed and the application is judged as having been untampered with, the judgment is made based on both the access permission 225 set in step S23 and the permission information file 28 registered in the authentication status holding unit 218 in step S33.

The following explains how the Java (registered trademark) class library 203 controls access to a resource by the application 14 which is a tentative unsigned application.

Figure 15:
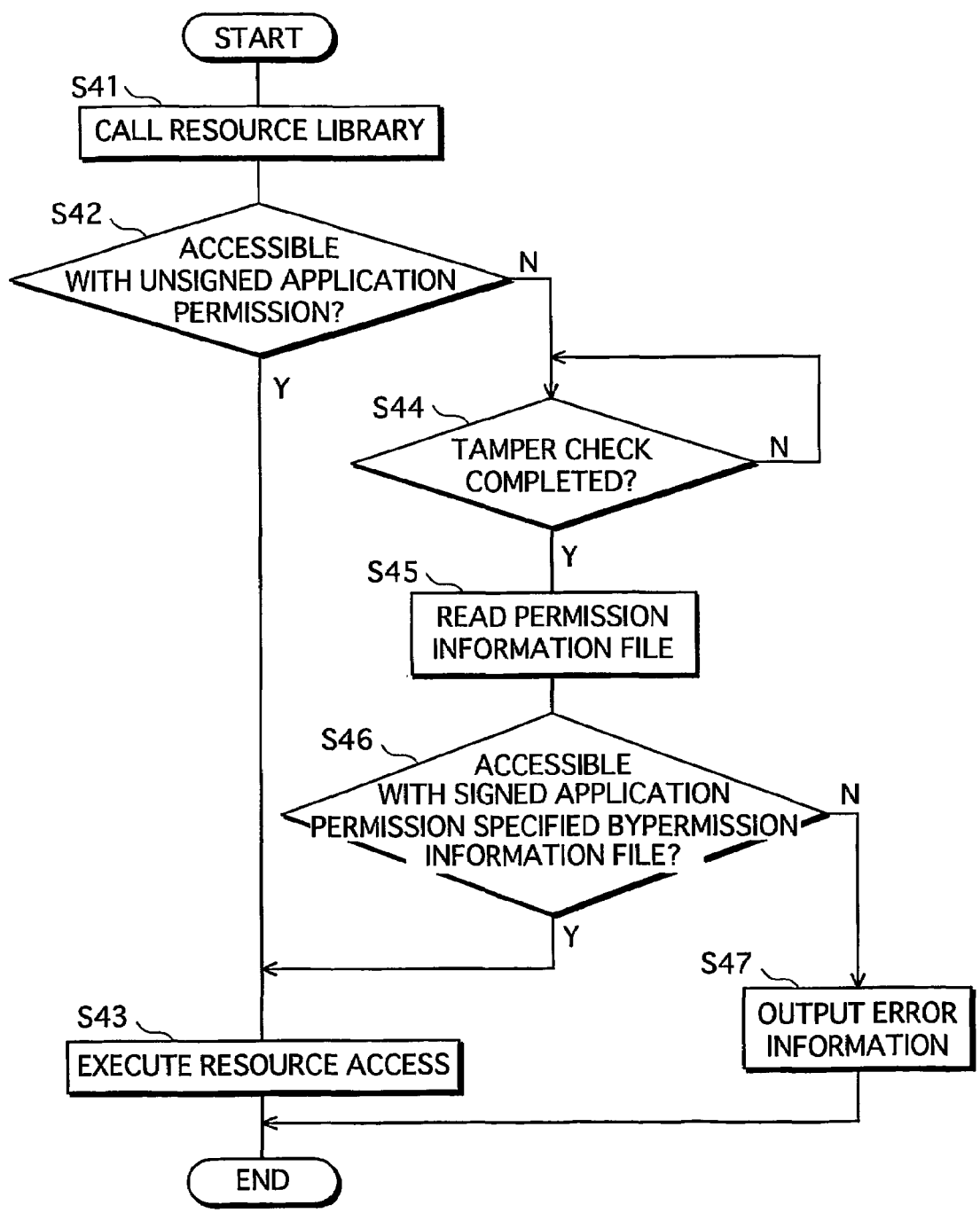
FIG. 15 is a flowchart showing a procedure of controlling access to a resource by the application.

FIG. 15 is a flowchart showing a procedure of controlling access to a resource by the application 14.

When the application 14 needs to access a resource, such as connecting to the network or reading a file from the secondary storage unit 111, the application 14 calls the resource library 222 in the Java (registered trademark) class library 203 (S41).

Upon receipt of the call, the resource library 222 inquires of the security management unit 221 whether the application 14 is permitted to access the resource.

The security management unit 221 refers to the access permission 225 via the permission check unit 224, to judge whether the access permission 225 includes the right to access the resource (S42). Here, the unsigned application permission is set as the access permission 225 in step S23 in FIG. 14A. This being so, if the unsigned application permission includes the access right to the resource (S42: YES), the security management unit 221 notifies the resource library 222 that the application 14 is permitted to access the resource. The resource library 222 accordingly authorizes the application 14 to access the resource and sends a request to the resource (S43), before ending the procedure. In this way, the application 14 accesses the resource.

If the unsigned application permission set as the access permission 225 does not include the access right to the resource (S42: NO), the security management unit 221 inquires of the authentication status management unit 215 about the authentication status.

If the tamper check by the tamper check thread is not completed (S44: NO), the authentication status management unit 215 waits for the completion of the tamper check. Once the tamper check has been completed (S44: YES), the authentication status management unit 215 reads the permission information file 28 from the authentication status holding unit 218, and passes the permission information file 28 to the security management unit 221 (S45).

The security management unit 221 receives the permission information file 28 from the authentication status management unit 215, and judges whether the permission information file 28 includes the access right to the resource (S46). The security management unit 221 notifies the judgment result to the resource library 222.

If the permission information file 28 includes the access right to the resource (S46: YES), the resource library 222 authorizes the application 14 to access the resource, and sends a request to the resource (S43). In this way, the application 14 accesses the resource. If the permission information file 28 does not include the access right to the resource (S46: NO), the resource library 222 sends error information indicating prohibition to access the resource to the application 14 (S47), before ending the procedure. In this case, no further execution of the application 14 is possible and so the application 14 is terminated. This completes the procedure of controlling resource access by the application 14 which is a tentative unsigned application.

According to the above procedure, the application 14 which is a tentative unsigned application is activated with grant of the unsigned application permission before the completion of the tamper check, and instructions in the application 14 are sequentially executed beginning with a top instruction. After the tamper check is completed and the application 14 is judged as having been untampered with, the application 14 is further granted the signed application permission specified by the permission information file 28 generated by the transmitter of the application 14. Subsequently, even when the execution reaches an instruction to access a resource which is not included in the unsigned application permission, the instruction can be executed if the signed application permission specified by the permission information file 28 includes the access right to the resource.

Accordingly, the application 14 can be activated promptly with grant of the unsigned application permission, without waiting for the tamper check to be completed. Since the application 14 is prohibited from access to resources not included in the unsigned application permission until the completion of the tamper check, high security is maintained. After the tamper check is completed and the application 14 is judged as having been untampered with, the application 14 is further granted access to resources not included in the unsigned application permission. This makes it possible to realize high-function applications.

Suppose an instruction to render an image on the display 105 precedes an instruction which cannot be executed with the unsigned application permission in the application 14, and the unsigned application permission includes the right to display graphics. According to the above procedure, the image can be promptly displayed on the display 105 regardless of the total data size of the application 14, with it being possible to shorten a wait time of the viewer and improve operationality.

In the case of a conventional signed application, the tamper check for every file in the application 14 needs to be completed prior to activation, even when the application 14 only performs graphics display. If the total data size of such an application 14 is large, it takes a long time to acquire the application 14 from the transport stream and perform the tamper check on the application 14. This causes a delay in activation of the application 14 and therefore in generation of the graphics display. In the case of a tentative unsigned application according to this embodiment, on the other hand, the application 14 is activated with grant of the unsigned application permission prior to the completion of the tamper check. Accordingly, the graphics display can be generated promptly within the range of the unsigned application permission.

Note here that even when the application 14 is a tentative unsigned application, it is necessary, prior to activation, to judge the type of the application 14 using the application identifier 16 in the management information 15 and identify the transmitter of the application 14 using the transmitter information file 23. To do so, at least the management information 15, the transmitter information file 23, and the main class file 29 containing the top instruction of the application 14 need to be acquired prior to activation.

Figure 16:
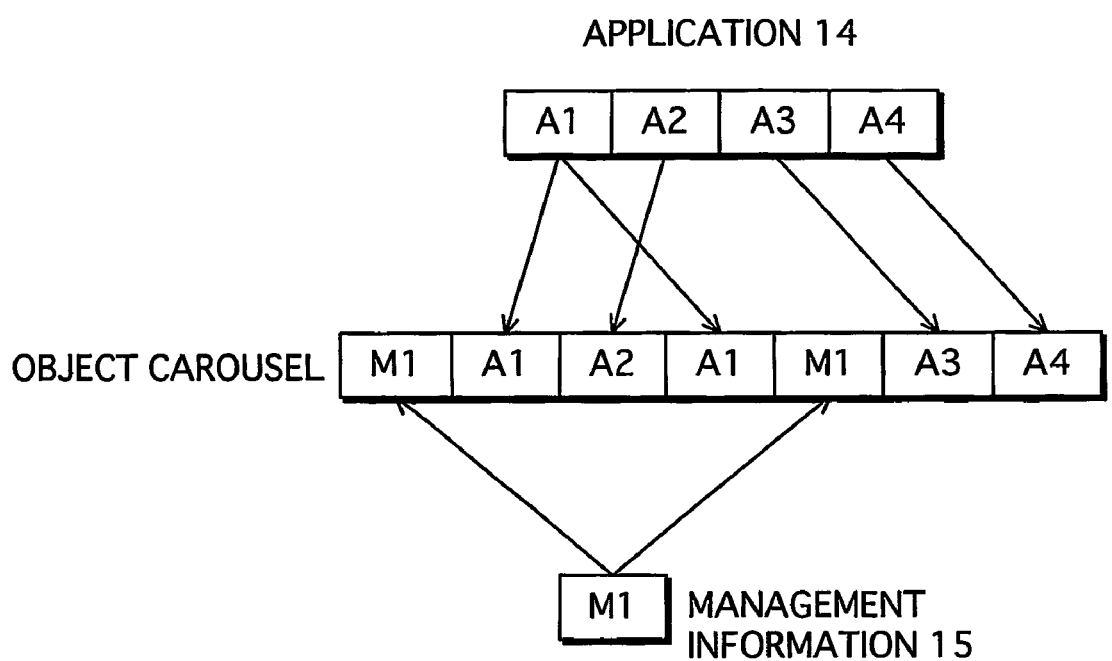
FIG. 16 shows an example of an object carousel carrying additional data shown in FIG. 2.

In view of this, an object carousel such as the one shown in FIG. 16 may be used to transmit the additional data 13. In the drawing, the application 14 is divided into four modules A1 to A4, and the management information 15 is contained in module M1. In this object carousel, module A1 carrying the transmitter information file 23 and the main class file 29 and module M1 carrying the management information 15 are transmitted more frequently than the other modules. This increases the possibility of reducing the time required to acquire the main class file 29, the transmitter information file 23, and the management information 15, regardless of at which part of the object carousel the TS decoder 101 starts acquiring the additional data 13. Hence the activation of the application 14 can be further accelerated.

Second Embodiment

The first embodiment describes an example of acquiring an application from a transport stream, but an application recorded on a removable recording medium can also be stored into the primary storage unit 110 and executed. When compared with an application transmitted in a transport stream from a broadcast station, however, an application recorded on a removable recording medium can be more easily analyzed using a personal computer and the like, and therefore is more likely to have been tampered with.

In view of this, the second embodiment of the present invention describes a digital television reception device which varies access permission tentatively granted to an application at the time of activation before completion of tamper check, depending on an acquisition path of the application.

Figure 17:
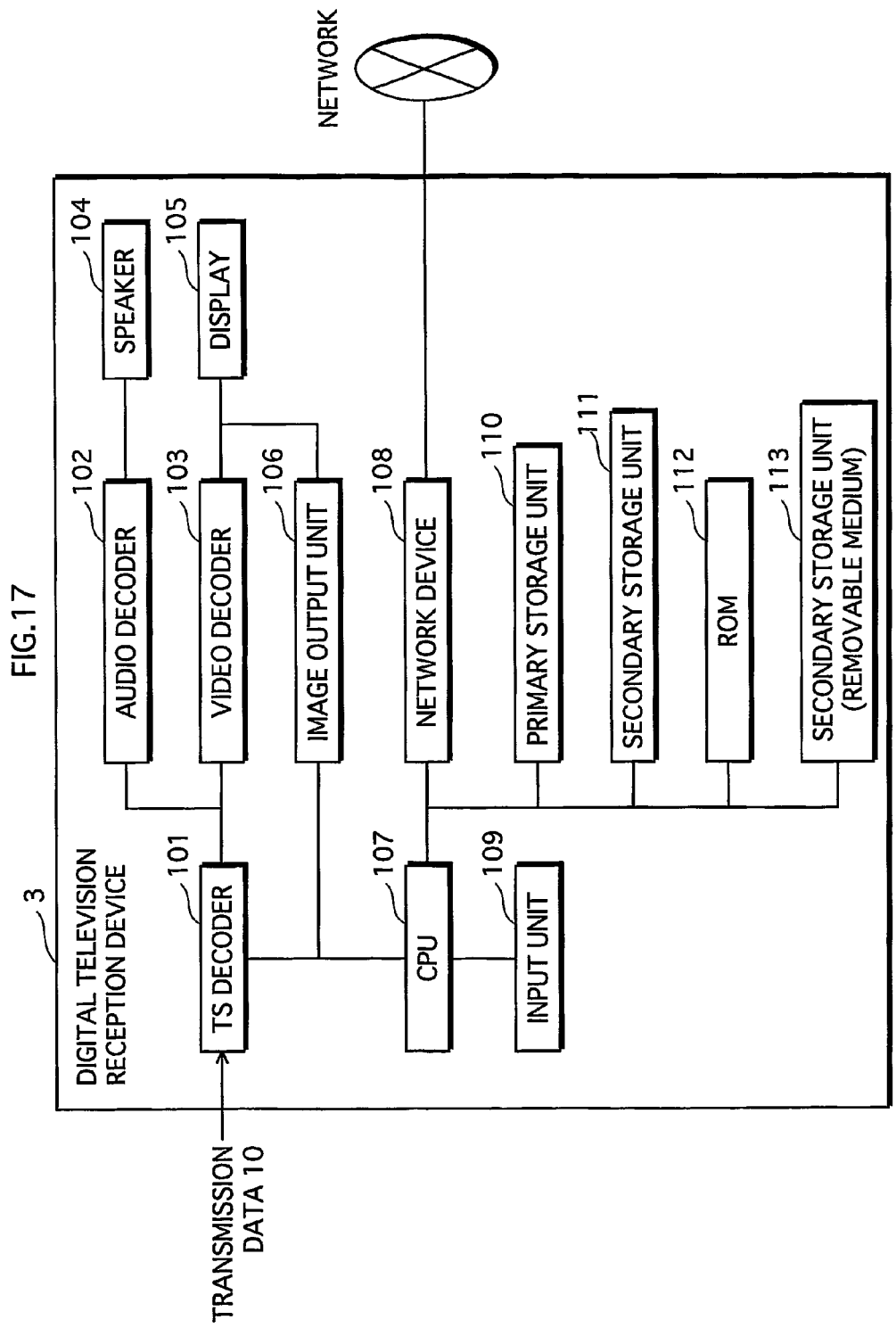
FIG. 17 shows a hardware construction of a digital television reception device to which the second embodiment of the present invention relates.

FIG. 17 shows a hardware construction of a digital television reception device 3 to which the second embodiment relates. Components which are the same as those in the first embodiment have been given the same reference numerals and their explanation has been omitted.

The digital television reception device 3 differs from the digital television reception device 2 of the first embodiment, in that a secondary storage unit 113 is further included.

The secondary storage unit 113 is a removable nonvolatile memory such as an SD card or an optical disc. Different applications are stored in the secondary storage unit 111 and the secondary storage unit 113.

Figure 18:
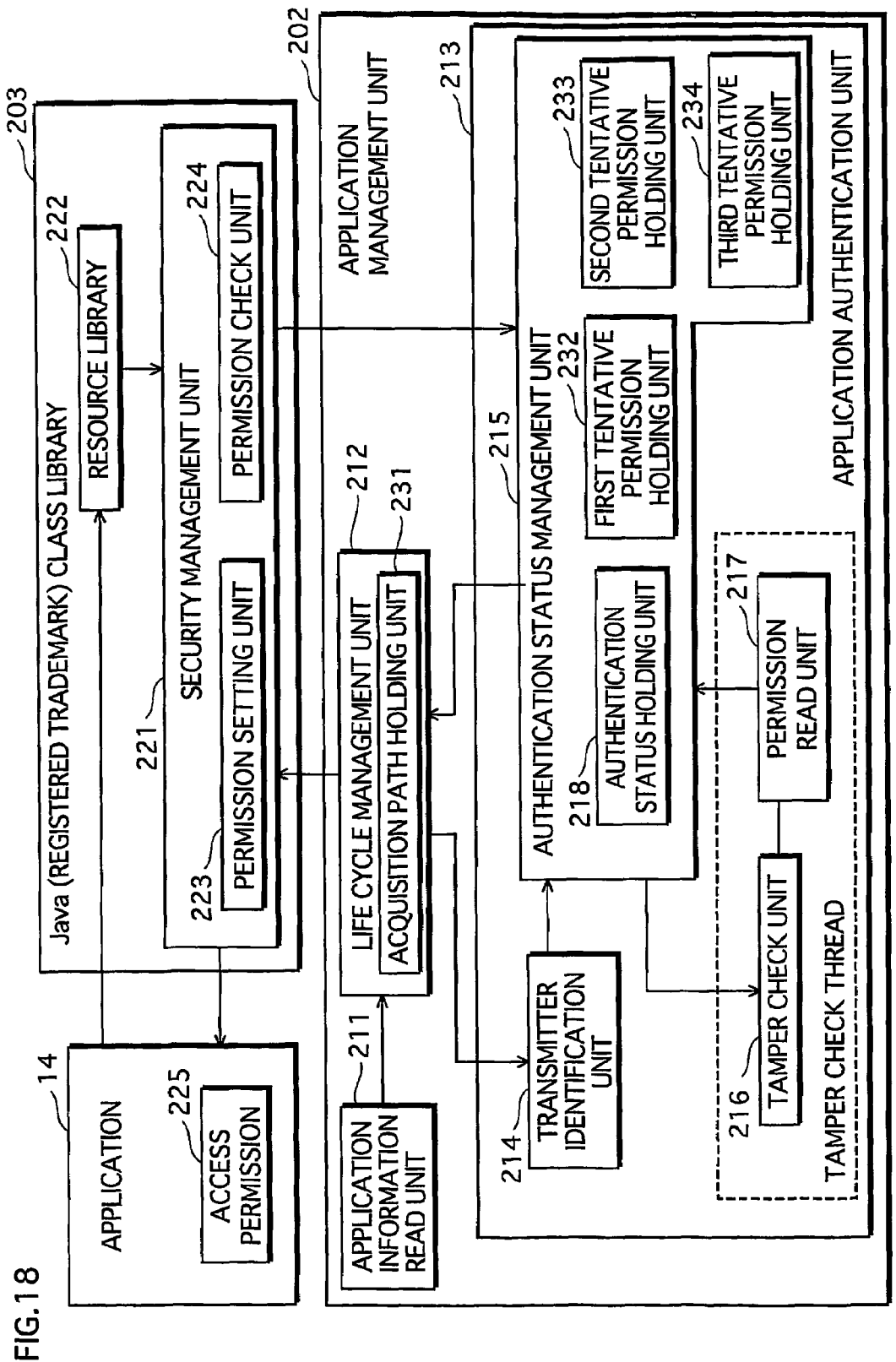
FIG. 18 shows a functional construction for controlling execution of the application in the digital television reception device shown in FIG. 17.

FIG. 18 shows a functional construction for controlling the execution of the application 14 in the digital television reception device 3. This construction differs from that of the first embodiment shown in FIG. 12, in that the life cycle management unit 212 includes an acquisition path holding unit 231, and the authentication status management unit 215 includes a first tentative permission holding unit 232, a second tentative permission holding unit 233, and a third tentative permission holding unit 234 in place of the unsigned application permission holding unit 219.

The acquisition path holding unit 231 is a functional block for holding acquisition path information showing the acquisition path through which the application 14 stored in the primary storage unit 110 has been acquired. This acquisition path information is acquired by the application information read unit 211 and set in the acquisition path holding unit 231, when the application 14 is stored into the primary storage unit 110. There are mainly four acquisition paths: an application separated from a transport stream; an application read from the secondary storage unit 111; an application read from the secondary storage unit 113; and an application downloaded from the Internet. In this embodiment, the risk of tampering for these acquisition paths is assumed to increase in the order of the transport stream, the secondary storage unit 111, the secondary storage unit 113, and the Internet.

The first tentative permission holding unit 232, the second tentative permission holding unit 233, and the third tentative permission holding unit 234 hold first tentative permission information, second tentative permission information, and third tentative permission information, respectively. The first tentative permission information, the second tentative permission information, and the third tentative permission information each show permission to access resources. The number of accessible resources decreases in the order of the first tentative permission information, the second tentative permission information, and the third tentative permission information. In more detail, the first tentative permission information shows first tentative permission which includes the display control right, the right to control a transport stream and select a channel, and the right to access the secondary storage units 111 and 113. The second tentative permission information shows second tentative permission which includes the display control right and the right to access the secondary storage units 111 and 113. The third tentative permission information shows third tentative permission which includes the display control right and the right to access the secondary storage unit 113 that is a removable nonvolatile memory. Like the unsigned application permission information in the first embodiment, the first tentative permission information, the second tentative permission information, and the third tentative permission information are each realized by writing the corresponding permission in XML.

The digital television reception device 3 having the above construction sets the access permission 225 which is granted to the application 14 at the time of activation, in the following manner. Here, the digital television reception device 3 grants access to more resources to the application 14 when the acquisition path of the application 14 has a lower risk of tampering.

Figure 19:
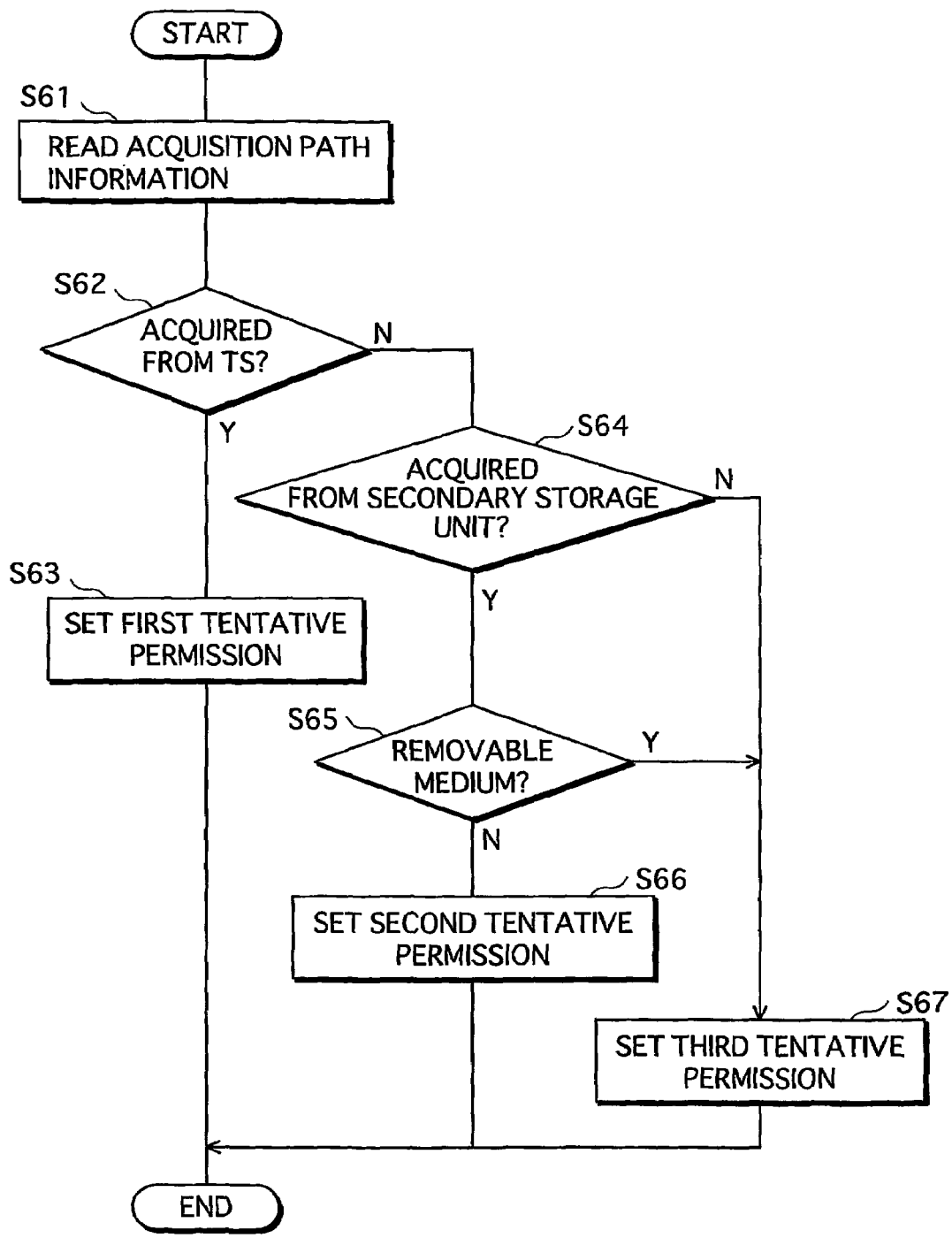
FIG. 19 is a flowchart showing a procedure of setting access permission at the time of activation in the digital television reception device shown in FIG. 17.

FIG. 19 is a flowchart showing a procedure of setting the access permission 225 at the time of activation in the digital television reception device 3.

The life cycle management unit 212 reads the acquisition path information from the acquisition path holding unit 231 (S61). The life cycle management unit 212 judges through which acquisition path the application 14 has been acquired, based on the read acquisition path information (S62, S64, and S65).

If the application 14 has been acquired from a transport stream (S62: YES), the life cycle management unit 212 reads the first tentative permission information from the first tentative permission holding unit 232, and instructs the security management unit 221 to set the first tentative permission shown by the first tentative permission information as the access permission 225 (S63).

If the application 14 has been read from the secondary storage unit 111 (S64: YES and S65: NO), the life cycle management unit 212 reads the second tentative permission information from the second tentative permission holding unit 233, and instructs the security management unit 221 to set the second tentative permission shown by the second tentative permission information as the access permission 225 (S66).

If the application 14 has been read from the secondary storage unit 113 (S64: YES and S65: YES) or downloaded from the Internet (S64: NO), the life cycle management unit 212 reads the third tentative permission information from the third tentative permission holding unit 234, and instructs the security management unit 221 to set the third tentative permission shown by the third tentative permission information as the access permission 225 (S67).

According to this procedure, the access permission 225 tentatively granted to the application 14 at the time of activation is varied depending on the acquisition path of the application 14. If the acquisition path of the application 14 has a lower risk of tampering, the application 14 is tentatively granted access to more resources. Since more instructions in the application 14 can be carried out with grant of access to more resources, the possibility of having to wait for the completion of the tamper check due to the occurrence of a resource call not permitted within the tentative permission decreases.

This embodiment describes the case where the risk of tampering for the acquisition paths increases in the order of a transport stream, the secondary storage unit 111, the secondary storage unit 113, and the Internet. In the case of the Internet, however, the risk of tampering further differs between when downloading data, which is transmitted by TCP/IP, in encrypted form using SSL or the like and when downloading data in unencrypted form without using SSL or the like. Which is to say, the risk of tampering is higher when downloading the application 14 without using SSL. Hence the present invention can also be applied to an application execution device which downloads an application from the Internet and executes it, by varying the access permission tentatively granted to the application depending on the use of SSL. In detail, if the application 14 is downloaded from the Internet using SSL, the application 14 is tentatively granted access to more resources than when the application 14 is downloaded without using SSL.

The second embodiment describes the case where the access permission tentatively granted to the application 14 is varied depending on the risk of tampering of the acquisition path of the application 14. As an alternative, the access permission tentatively granted to the application 14 may be varied depending on the time period required for application acquisition through the acquisition path. This time period required for application acquisition can be determined based on factors such as a data transfer rate of a transport stream or a data access time of a secondary storage unit. This being so, when the acquisition path of the application 14 requires a longer time period for application acquisition, access to more resources may be tentatively granted to the application 14. In so doing, when it takes a longer time to acquire the application 14 and therefore to perform tamper check, the application 14 is tentatively granted access to more resources, so that more instructions in the application 14 can be carried out. This allows the viewer to use the application 14 without noticing that the tamper check has not been completed.

Also, it takes considerably less time to read an application from a secondary storage unit than to acquire an application from a transport stream. In view of this, a procedure shown in FIG. 20 may be employed.

Figure 20:
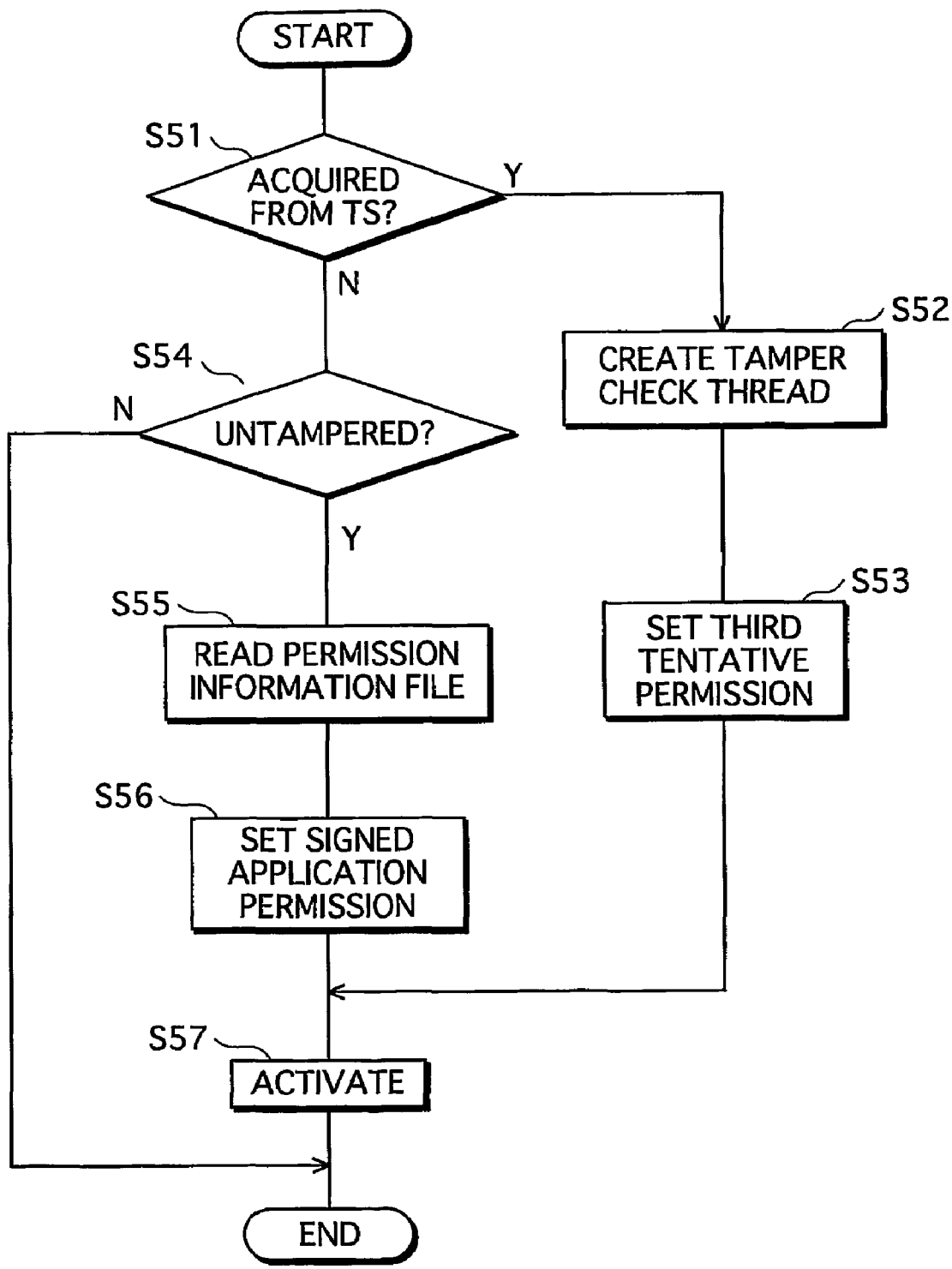
FIG. 20 is a flowchart showing a procedure which is a modification to the second embodiment.

In FIG. 20, if the acquisition path of the application 14 is a transport stream (S51: YES), the tamper check thread is created without waiting for the whole application 14 to be stored into the primary storage unit 110 (S52). The application 14 is then granted the third tentative permission (S53) and activated (S57). If the acquisition path of the application 14 is not a transport stream (S51: NO), steps S54 to S57 are performed after the whole application 14 is stored into the primary storage unit 110, in the same way as a conventional signed application. In so doing, the activation of the application 14 is speeded up only if the acquisition of the application 14 takes a long time. Otherwise, the application 14 is executed securely according to the procedure for a conventional signed application.

(Modifications)

The present invention has been described by way of the above embodiments, though it should be obvious that the present invention is not limited to the above. Example modifications are given below.

(1) The present invention also applies to an application execution method shown by the flowcharts in the above embodiments. This method may be realized by a computer-readable program that can be executed by a computer. Such a computer program may be distributed as a digital signal.

The present invention may be realized by a computer-readable recording medium, such as a flexible disk, a hard disk, a CD-ROM, an MO, a DVD, a DVD-ROM, a DVD-RAM, a BD (Blu-ray Disc), or a semiconductor memory, on which a computer-readable program and/or digital signal mentioned above is recorded.

Conversely, the present invention may also be realized by a computer-readable program and/or digital signal that is recorded on such a recording medium.

A computer-readable program or digital signal that achieves the present invention may also be transmitted via a network, such as an electronic communications network, a wired or wireless communications network, or the Internet.

Also, the computer program and/or digital signal may be provided to an independent computer system by distributing a recording medium on which the computer-readable program and/or digital signal is recorded, or by transmitting the computer-readable program and/or digital signal via a network. The independent computer system may then execute the computer-readable program and/or digital signal to function as the present invention.

(2) The present invention may also be realized by an LSI circuit which controls the application execution device. Such an LSI circuit can be implemented by integrating the functional blocks shown in FIG. 12 or 18. These functional blocks may be individually constructed in chips, or partly or wholly constructed in one chip.

The LSI circuit mentioned here may be an IC, a system LSI circuit, a super LSI circuit, or an ultra LSI circuit depending on the degree of integration.

Alternatively, a dedicated circuit or a general-purpose processor may be used for circuit integration instead of LSI. An FPGA (Field Programmable Gate Array) which is an LSI chip programmable after manufacture and a reconfigurable processor capable of reconfiguring connections and settings of circuit cells within an LSI chip are applicable too.

If a new IC technique that can replace the conventional LSI is developed as a result of the advance of semiconductor and other technologies in the future, the functional blocks and components described in the above embodiments may be integrated using this technique. For example, biotechnology may be adopted for such a technique.

(3) The first embodiment describes the case where an application is activated with grant of unsigned application permission prior to completion of tamper check. However, the present invention is not limited to such, so long as the application is tentatively granted such access permission that will not adversely affect the device. For instance, the application may be granted the unsigned application permission except access rights that are judged as having a risk of adversely affecting the device. Alternatively, the application may be granted all access rights included in the unsigned application permission and further the access right to files in the secondary storage unit 111 which have been confirmed as being accessible without a loss of security.

(4) The first embodiment describes the case where a transport stream is transmitted from one broadcast device and received by one digital television reception device. The present invention, however, is not limited to such a numerical relationship between broadcast devices and digital television reception devices, as the system may include a plurality of broadcast devices for transmitting transport streams and a plurality of digital television reception devices for receiving transport streams.

(5) The present invention is not limited to specific physical characteristics of a transmission path of an application, and is applicable to applications transmitted via various transmission paths such as a terrestrial wave, a satellite, and a cable television.

(6) The first and second embodiments describe a digital television reception device as an example of the application execution device of the present invention, but the present invention is equally applicable to other environments, such as a mobile telephone, for executing applications.

(7) The limitations described in the first and second embodiments and the modifications may be freely combined.

INDUSTRIAL APPLICABILITY

The application execution device of the present invention has an effect of speeding up activation of an application, and can be effectively used, for example, for a digital television reception device which acquires an application transmitted using an object carousel and executes the acquired application.

The invention claimed is:

1. An application execution device comprising:
an acquisition unit operable to acquire an application program which includes instructions to access resources and which is used in a Multimedia Home Platform;
a judgment unit operable to judge whether the application program has been tampered with;
a tentative permission setting unit operable to obtain tentative permission information showing permission to access only a first resource;
a definite permission setting unit operable to obtain definite permission information showing permission to access the first resource and a second resource; and
an execution unit operable to execute the application program,
wherein, when the application program is a signed application program that requires authentication in order to be executed and before the judgment unit completes the judging whether the signed application program has been tampered with, the execution unit executes the signed application program within a range of the permission shown by the tentative permission information, and when after the judgment unit completes the judging whether the signed application program has been tampered with and the signed application program is judged as not having been tampered with, the execution unit executes the signed application program within a range of the permission shown by the definite permission information.

2. The application execution device of claim 1, wherein the execution unit assumes a file size of the application program to be zero, if the application program is judged as having been tampered with.

3. The application execution device of claim 1, wherein the execution unit staffs executing the application program before the acquisition unit completes the acquisition of the application program.

4. The application execution device of claim 3, wherein the acquisition unit acquires the application program by receiving a digital stream carrying the application program.

5. The application execution device of claim 4, wherein the digital stream is a transport stream of digital television broadcasting, and
the application program is multiplexed in the transport stream using an object carousel.

6. The application execution device of claim 5 further comprising:

a transmitter identification unit operable to identify a transmitter of the application program based on transmitter information for identifying the transmitter,
wherein the object carousel contains the transmitter information in addition to the application program,
the acquisition unit further acquires the transmitter information, and
the execution unit staffs executing the application program after the transmitter identification unit completes the identification of the transmitter.

7. The application execution device of claim 1,
wherein the acquisition unit further acquires an application identifier showing a type of the application program, and
the execution unit starts executing the application program before the judgment unit completes the judgment, if the type shown by the acquired application identifier matches a predetermined type.

8. The application execution device of claim 7,
wherein the predetermined type is a type of application program that is permitted to access only the first resource until the judgment unit completes the judging.

9. The application execution device of claim 1,
wherein when the execution unit, while executing the application program, reaches an instruction to access the second resource but the judgment unit has not completed the judging, the execution unit waits until the judgment unit completes the judging.

10. The application execution device of claim 1,
wherein the application program includes hash information showing a hash value of the application program, and
the judgment unit judges whether the application program has been tampered with by calculating a hash value of the application program and comparing the calculated hash value with the hash value shown by the hash information.

11. The application execution device of claim 1,
wherein the acquisition unit acquires the application program through one of a plurality of acquisition paths, the plurality of acquisition paths each having a different level of risk of tampering,
the tentative permission setting unit obtains tentative permission information corresponding to the acquisition path of the application program, and
when the acquisition path of the application program has a lower level of risk of tampering, the tentative permission information corresponding to the acquisition path shows the permission to access the first resource, the permission including access to a resource having a higher risk of adversely affecting the application execution device.

12. The application execution device of claim 11,
wherein when the application program is in an encrypted form, the acquisition path of the application program has the lower level of risk of tampering, and
when the application program is in an unencrypted form, the acquisition path of the application program has a higher level of risk of tampering.

13. The application execution device of claim 1,
wherein the acquisition unit acquires the application program through one of a plurality of acquisition paths, the plurality of acquisition paths each having a different time period required for acquiring an application program,
the tentative permission setting unit obtains tentative permission information corresponding to the acquisition path of the application program, and when the acquisition path of the application program has a longer time period required, the tentative permission information corresponding to the acquisition path shows the permission to access the first resource, the permission including access to a resource having a higher risk of adversely affecting the application execution device.

14. An integrated circuit for controlling an application execution device, the integrated circuit comprising:
- an acquisition unit operable to acquire an application program which includes instructions to access resources and which is used in an Multimedia Home Platform;
- a judgment unit operable to judge whether the application program has been tampered with;
- a tentative permission setting unit operable to obtain tentative permission information showing permission to access only a first resource;
- a definite permission setting unit operable to obtain definite permission information showing permission to access the first resource and a second resource; and
- an execution unit operable to execute the application program,
- wherein, when the application program is a signed application program that requires authentication in order to be executed and before the judgment unit completes the judging whether the signed application program has been tampered with, the execution unit executes the signed application program within a range of the permission shown by the tentative permission information, and, when after the judgment unit completes the judging whether the signed application program has been tampered with and the signed application program is judged as not having been tampered with, the execution unit executes the signed application program within a range of the permission shown by the definite permission information.

15. An application execution method used by an application execution device, the method comprising:
- an acquisition step of acquiring, using an acquisition unit, an application program which includes instructions to access resources and which is used in a Multimedia Home Platform;
- a judgment step of judging, using a judgment unit, whether the application program has been tampered with;
- a tentative permission setting step of obtaining, using a tentative permission setting unit, tentative permission information showing permission to access only a first resource;
- a definite permission setting step of obtaining, using a definite permission setting unit, definite permission information showing permission to access the first resource and a second resource; and
- an execution step of executing using an execution unit, the application program,
- wherein, when the application program is a signed application program that requires authentication in order to be executed and before the judgment step completes the judging whether the signed application program has been tampered with, the execution step executes the signed application program within a range of the permission shown by the tentative permission information, and, when after the judgment step completes the judging of whether the signed application program has been tampered with and the signed application program is judged as not having been tampered with, the execution step executes the signed application program within a range of the permission shown by the definite permission information.

16. A computer-readable recording medium having recorded thereon a computer-readable program that when executed causes a computer to perform an application execution method comprising:
- an acquisition step of acquiring an application program which includes instructions to access resources and which is used in a Multimedia Home Platform;
- a judgment step of judging whether the application program has been tampered with;
- a tentative permission setting step of obtaining tentative permission information showing permission to access only a first resource;
- a definite permission setting step of obtaining definite permission information showing permission to access the first resource and a second resource; and
- an execution step of executing the application program,
- wherein, when the application program is a signed application program that requires authentication in order to be executed and before the judgment step completes the judging whether the signed application program has been tampered with, the execution step executes the signed application program within a range of the permission shown by the tentative permission information, and, when after the judgment step completes the judging and the signed application program is judged as not having been tampered with, the execution step executes the signed application program within a range of the permission shown by the definite permission information.

* * * * *

UNITED STATES PATENT AND TRADEMARK OFFICE
CERTIFICATE OF CORRECTION

PATENT NO. : 7,676,847 B2
APPLICATION NO. : 10/571141
DATED : March 9, 2010
INVENTOR(S) : Yoshinori Imanishi It is certified that error appears in the above-identified patent and that said Letters Patent is hereby corrected as shown below:

In column 21, claim 3, line 54, "staffs" should read --starts--.

Signed and Sealed this

Third Day of August, 2010

David J. Kappos
*Director of the United States Patent and Trademark Office*